(12) United States Patent
Virk et al.

(10) Patent No.: US 8,316,293 B2
(45) Date of Patent: Nov. 20, 2012

(54) SYSTEM AND METHOD FOR RENDERING PRESENTATION PAGES BASED ON LOCALITY

(75) Inventors: Sarinder Virk, Maple Valley, WA (US); Chris Lira, Bellevue, WA (US); Nathan Provo, Ravensdale, WA (US)

(73) Assignee: Research In Motion Limited, Waterloo, Ontario (CA)

( * ) Notice: Subject to any disclaimer, the term of this patent is extended or adjusted under 35 U.S.C. 154(b) by 1639 days.

(21) Appl. No.: 11/389,970

(22) Filed: Mar. 27, 2006

(65) Prior Publication Data

US 2007/0226608 A1   Sep. 27, 2007

(51) Int. Cl.
*G06F 17/20* (2006.01)
*G06F 17/21* (2006.01)

(52) U.S. Cl. ........................................ 715/236; 715/237

(58) Field of Classification Search .................. 715/236, 715/237
See application file for complete search history.

(56) References Cited

U.S. PATENT DOCUMENTS

| | | | | |
|---|---|---|---|---|
| 6,643,652 B2 * | 11/2003 | Helgeson et al. | | 1/1 |
| 6,715,129 B1 | 3/2004 | Hind et al. | | 715/513 |
| 7,072,984 B1 * | 7/2006 | Polonsky et al. | | 709/246 |
| 7,266,595 B1 * | 9/2007 | Black et al. | | 709/223 |
| 7,340,046 B2 * | 3/2008 | McClung et al. | | 379/202.01 |
| 7,454,623 B2 * | 11/2008 | Hardt | | 713/182 |
| 7,802,174 B2 * | 9/2010 | Teng et al. | | 715/200 |
| 2001/0029505 A1 | 10/2001 | Gaudette et al. | | 707/102 |
| 2002/0090933 A1 | 7/2002 | Rouse et al. | | 455/412 |
| 2002/0129153 A1 | 9/2002 | Fleming | | 709/230 |
| 2002/0194221 A1 | 12/2002 | Strong et al. | | 707/513 |
| 2002/0198908 A1 * | 12/2002 | Hartel | | 707/513 |
| 2003/0037076 A1 | 2/2003 | Bravery et al. | | 707/517 |
| 2003/0037181 A1 | 2/2003 | Freed | | 709/328 |
| 2003/0040280 A1 * | 2/2003 | Koskelainen | | 455/67.1 |
| 2003/0046316 A1 | 3/2003 | Gergic et al. | | 707/513 |
| 2003/0093511 A1 * | 5/2003 | Barde et al. | | 709/223 |
| 2003/0237046 A1 | 12/2003 | Parker et al. | | 715/513 |
| 2004/0083453 A1 | 4/2004 | Knight et al. | | 717/113 |
| 2004/0117769 A1 | 6/2004 | Lauzon et al. | | 717/125 |
| 2004/0128652 A1 | 7/2004 | Mandava et al. | | 717/124 |
| 2004/0133848 A1 | 7/2004 | Hunt et al. | | 715/500 |
| 2004/0205175 A1 * | 10/2004 | Kammerer | | 709/223 |
| 2004/0207657 A1 | 10/2004 | Svendsen | | 345/738 |
| 2004/0225749 A1 | 11/2004 | Pavlik et al. | | 709/245 |
| 2004/0250213 A1 | 12/2004 | Shalabi et al. | | 715/762 |

(Continued)

OTHER PUBLICATIONS

Handorean R. et al., "*A Component Deployment Mechanism Supporting Service Orieinted Computing in Ad Hoc Networks*", Jan. 23, 2004, Washington University Technical Report WUCSE-2004-2, Retrieved from the Internet: URL:http://www.cse.seas.wusti.edu/Research/Publications.asp [retrieved on Apr. 21, 2008].

(Continued)

*Primary Examiner* — Doug Hutton, Jr.
*Assistant Examiner* — Soumya Dasgupta
(74) *Attorney, Agent, or Firm* — Allen, Dyer, Doppelt, Milbrath & Gilchrist, P.A.

(57) ABSTRACT

A system renders presentation pages such as in a wireless communications system. A server includes an extensible stylesheet transformation (XSLT) module. A storage medium contains at least one of images and text. The XSLT module is operative for calling an XSL extension and rendering the at least one of images and text into a presentation page based on a language requirement at a foreign locale.

21 Claims, 15 Drawing Sheets

U.S. PATENT DOCUMENTS

| | | | | |
|---|---|---|---|---|
| 2005/0022120 | A1 | 1/2005 | Takahashi | 715/522 |
| 2005/0036498 | A1* | 2/2005 | Clarke et al. | 370/395.52 |
| 2005/0038796 | A1 | 2/2005 | Carlson et al. | 707/100 |
| 2005/0066273 | A1 | 3/2005 | Zacky | 715/517 |
| 2005/0091068 | A1 | 4/2005 | Ramamoorthy et al. | 705/1 |
| 2005/0120106 | A1 | 6/2005 | Albertao | 709/223 |
| 2005/0193075 | A1 | 9/2005 | Haff et al. | 709/206 |
| 2005/0246769 | A1* | 11/2005 | Bao et al. | 726/16 |
| 2005/0251551 | A1* | 11/2005 | Mitchell et al. | 709/203 |
| 2006/0025670 | A1 | 2/2006 | Kim et al. | 600/407 |
| 2006/0031763 | A1 | 2/2006 | Yeung | 715/523 |
| 2006/0155733 | A1* | 7/2006 | John et al. | 707/101 |
| 2006/0161863 | A1* | 7/2006 | Gallo | 715/810 |
| 2006/0265689 | A1 | 11/2006 | Kuznetsov et al. | 717/117 |
| 2009/0150518 | A1 | 6/2009 | Lewin et al. | 709/219 |

OTHER PUBLICATIONS

Hauswirth M. et al: "*A Component and Communication Model for Push Systems*", 1999, Lecture Notes in Computer Science, vol. 1687/1999, pp. 20-38, Retrieved from the Internet: URL:http://www.springerlink.com/content/2jnxnyxhwrggkb8g/ [retrieved on Apr. 21, 2008].

Dabkowski, A. et al., "*Designing Global Applications for Wireless Devices with Java and XML*," Proceedings of the $23^{rd}$ Internationalization and Unicode Conference, Mar. 2003, pp. 1-15.

Cowan, T., "*XSLT Blooms with Java*," Online Publication, Dec. 21, 2001, 6 pages.

Shershnev, E., "*Re: Multi Language Handling With XSLT*," Online Publication, Jul. 24, 2002, 1 page.

Englehart, M. et al., "*Xalan Extensions Classpath*," Online Publication, Mar. 1, 2002, 1 page.

Brandon, D., "*Issues in the Globalization of Electronic Commerce*," Online Excerpt of "Architectural Issues of Web-Enabled Electronic Business," 2003, pp. 1-22.

Savarese D. F., "*Loading Icons and Other Graphics into an Application Using a Resource Bundle*," Online Publication, Mar. 1, 1999, 4 pages.

Deitsch et al., "*Isolating Locale Specific Data with Resource Bundles*," Online Document—Chapter 4 of "Java Internationalization," Mar. 2001, pp. 63-91.

Anonymous, "*Programmatically Importing Stylesheet, Can it be Done?*" Online Publication, Oct. 14, 2001, 3 pages.

\* cited by examiner

SYSTEM AND METHOD FOR RENDERING PRESENTATION PAGES BASED ON LOCALITY

FIELD OF THE INVENTION

The present invention relates to the field of communications systems, and, more particularly, to electronic mail (email) communications systems and related methods.

BACKGROUND OF THE INVENTION

Electronic mail (email) has become an integral part of business and personal communications. As such, many users have multiple email accounts for work and home use. Moreover, with the increased availability of mobile cellular and wireless local area network (LAN) devices that can send and receive emails, many users wirelessly access emails from mailboxes stored on different email storage servers (e.g., corporate email storage server, Yahoo, Hotmail, AOL, etc.).

Yet, email distribution and synchronization across multiple mailboxes and over wireless networks can be quite challenging, particularly when this is done on a large scale for numerous users. For example, different email accounts may be configured differently and with non-uniform access criteria. Moreover, as emails are received at the wireless communications device, copies of the emails may still be present in the original mailboxes, which can make it difficult for users to keep their email organized.

One particularly advantageous "push" type email distribution and synchronization system is disclosed in U.S. Pat. No. 6,779,019 to Mousseau et al., which is assigned to the present Assignee and is hereby incorporated herein by reference. This system pushes user-selected data items from a host system to a user's mobile wireless communications device upon detecting the occurrence of one or more user-defined event triggers. The user may then move (or file) the data items to a particular folder within a folder hierarchy stored in the mobile wireless communications device, or may execute some other system operation on a data item. Software operating at the device and the host system then synchronizes the folder hierarchy of the device with a folder hierarchy of the host system, and any actions executed on the data items at the device are then automatically replicated on the same data items stored at the host system, thus eliminating the need for the user to manually replicate actions at the host system that have been executed at the mobile wireless communications device.

The foregoing system advantageously provides great convenience to users of wireless email communication devices for organizing and managing their email messages. Yet, further convenience and efficiency features may be desired in email distribution and synchronization systems as email usage continues to grow in popularity. Efficiency would be increased in transforming application data into presentation information. More particularly, some WAP or HTML output could be based on user locale specially when different templates could be used for different languages. Localized versions of pages in a different language could be rendered and information could be passed back to reconcile for different languages in the email system. Commonly assigned U.S. patent application Ser. No. 60/720,899 filed Sep. 27, 2005 permits an extensible stylesheet transformation (XSLT) module to render images and text, but greater control based on locale is desired.

BRIEF DESCRIPTION OF THE DRAWINGS

Other objects, features and advantages of different embodiments will become apparent from the detailed description which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

A system renders presentation pages. A server includes an extensible stylesheet transformation (XSLT) module. A storage medium contains at least one of images and text. The XSLT module is operative for calling an XSL extension and rendering the at least one of images and text into a presentation page based on a language requirement at a foreign locale.

The presentation page can be rendered into localized content based on locale. Resource bundles can contain at least one of localized images and text and be rendered into an XML document to be processed by the XSLT module to generate localized content, which can be in a foreign language used at the locale.

In another aspect, the XSL extension can be formed as a JAVA extension and the XSLT module can render HTMP or WAP output. The server could be formed as a web server or email server. The server can also be operative for storing a plurality of resource deployment packages (RDP's), each RDP comprising deployment content that can be deployed based on locale.

In yet another aspect, the system can render presentation pages in a wireless communications system. A mobile wireless communications device is operable for communicating over a wireless communications network with a mobile office platform that includes an extensible stylesheet transformation (XSLT) module. A storage medium contains at least one of images and text. The XSLT module is operative for calling an XSL extension and rendering the at least one of images and text into a presentation page on the mobile wireless communications device based on a language requirement at a foreign locale.

A method aspect is also set forth.

Figure 1:
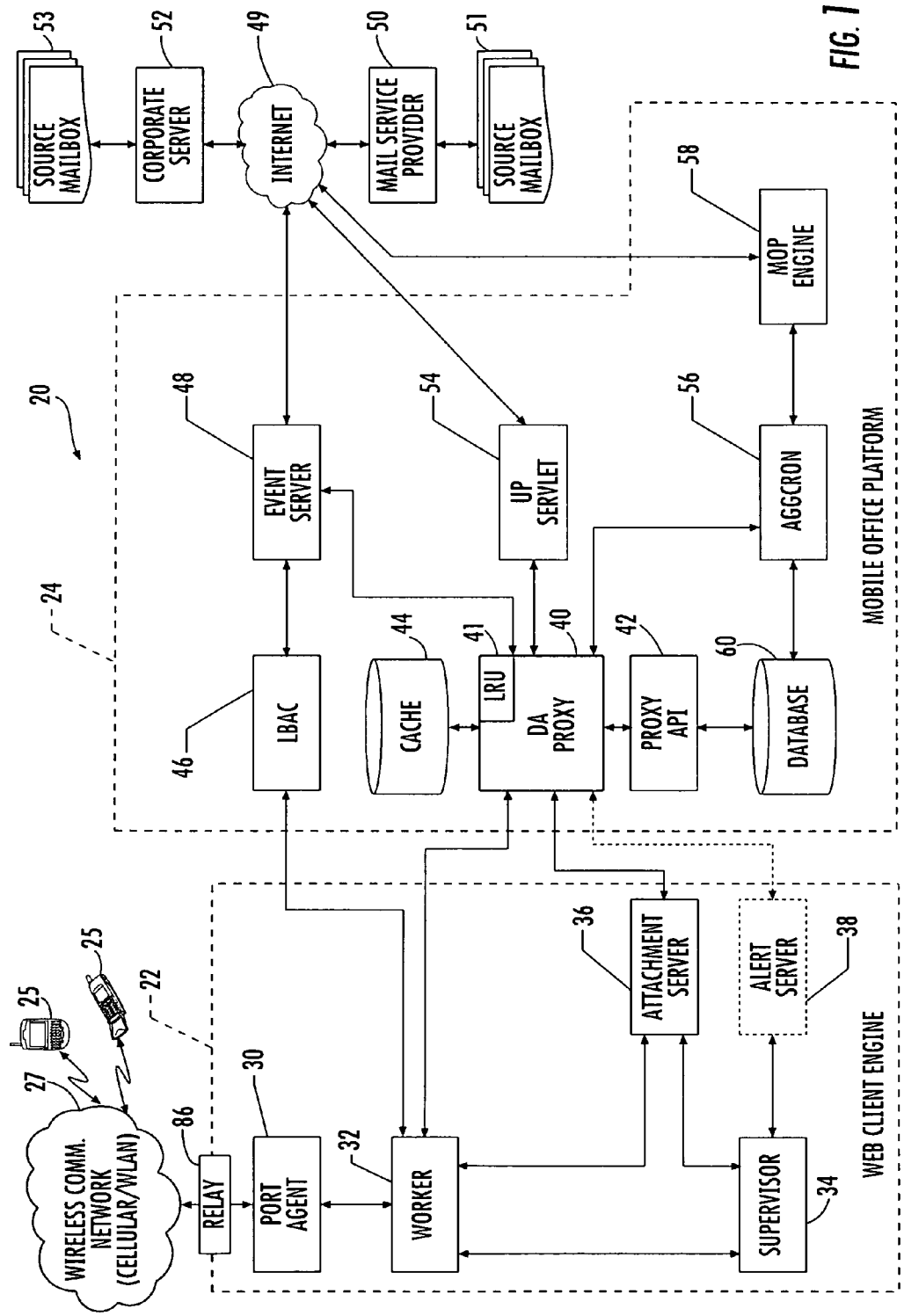
FIG. 1 is schematic block diagram of a direct access electronic mail (email) distribution and synchronization system.

Referring initially to FIG. 1, a direct access (DA) email distribution and synchronization system 20 allows direct access to different mail sources, allowing messages to be transferred directly to a mobile wireless handheld device from a source mailbox. As a result, different mail stores need not be used for integrated external source mail accounts, and a permanent copy of an email in a local email store is not required.

Although this diagram depicts objects as functionally separate, such depiction is merely for illustrative purposes. It will be apparent to those skilled in the art that the objects portrayed in this figure can be arbitrarily combined or divided into separate software, firmware or hardware components. Furthermore, it will also be apparent to those skilled in the art that such objects, regardless of how they are combined or divided, can execute on the same computing device or can be arbitrarily distributed among different computing devices connected by one or more networks.

The direct access system 20 enables email users or subscribers to have email from third party email services pushed to various mobile wireless communications devices 25. Users need not create a handheld email account to gain direct access to an existing external email account. The direct access system 20 may operate without performing aggregation as used in some prior art systems, in which emails are aggregated from multiple different source mailboxes to a single target mailbox. In other words, email need not be stored in an intermediate target mailbox, but instead may advantageously be accessed directly from a source mail store.

As illustrated in FIG. 1, the direct access system 20 illustratively includes a Web client (WC) engine 22 and a mobile office platform (MOP) 24. These Web client engine 22 and mobile office platform 24 operate together to provide users with direct access to their email from mobile wireless communications devices 25 via one or more wireless communications networks 27, for example. Both the Web client engine 22 and the mobile office platform 24 may be located at the same location or at separate locations, and implemented in one or more servers. The web client engine 22 illustratively includes a port agent 30 for communicating with the wireless communications devices 25 via the wireless communications network(s) 27, a worker 32, a supervisor 34, and an attachment server 36, which will be discussed further below. An alert server 38 is shown in dashed lines, and in one preferred embodiment, is not used, but could be part of the system in yet other embodiments.

The mobile office platform 24 illustratively includes a DA proxy 40, and a proxy application programming interface (API) 42 and a cache 44 cooperating with the DA proxy. The mobile office platform 24 also illustratively includes a load balance and cache (LBAC) module 46, an event server 48, a universal proxy (UP) Servlet 54, an AggCron module 56, a mobile office platform (MOP) engine 58, and a database (DB) engine 60, which will be discussed in further detail below. The Least Recently Used (LRU) cache 41 caches new messages, and can release messages and objects that were least recently used.

The supervisor 34 processes new mail notifications that it receives from the direct access proxy 40. It then assigns a job, in the form of a User Datagram Protocol (UDP) packet, to the least-loaded worker 32, according to the most recent UDP heartbeat the supervisor 34 has received. For purposes of this description, heartbeat is a tool that monitors the state of the server. Additionally, the supervisor 34 will receive a new service book request from the direct access proxy 40 to send service books to the mobile wireless communication device for new or changed accounts. A service book can be a class that could contain all service records currently defined. This class can be used to maintain a collection of information about the device, such as connection information or services, such as an email address of the account.

The worker 32 is an intermediary processing agent between the supervisor 34 and the port agent 30, and responsible for most processing in the Web client engine 22. It will retrieve e-mail from a universal proxy 54, via a direct access proxy, and format e-mail in Compressed Multipurpose Internet Mail Extension (CMIME) as a type of Multipurpose Internet Mail Extension, and send it to the port agent 30, for further processing. Its responsibilities include the following tasks: (1) messages sent to and received from the handheld; (2) message reply, forward and more requests; (3) Over The Air Folder Management operation (OTAFM); (4) attachment viewing; and (5) service book.

The port agent 30 acts as a transport layer between the infrastructure and the rest of the Web client engine 22. It is responsible for delivering packets to and from the mobile wireless communications device. To support different integrated mailboxes with one device, more than one service book can be used, and each service book can be associated with one integrated mailbox. A port agent 30 can include one Server Relay Protocol (SRP) connection to a relay, but it can also handle multiple SRP connections, and each connection may have a unique Globally Unique Identifier (GUID) associated with a service book. The attachment server 36 provides service for document/attachment conversion requests from workers 32.

The direct access proxy 40 provides a Web-based Distributed Authoring and Versioning (WebDAV) interface that is used by the worker 32 to access account and mailbox information. This provides functionality to create, change and move documents on a remote server, e.g., a Web server. The direct access proxy 40 typically will present an asynchronous interface to its clients. The LBAC module 46 is used by a notification server and the Web client engine 22 components to locate the proper DA proxy for the handling of a request. The universal proxy Servlet 54 abstracts access to disparate mail stores into a common protocol. The event server 48 responds to notifications of new messages from corporate servers 52 and/or mail service providers 50, which may be received via the Internet 40, for example. The notifications are communicated to the direct access proxy 40 by the AggCron module 56 and the event server 48 so that it may initiate checking for new mail on source mailboxes 51, 53 of the mail service providers 50 and/or corporate servers 52. The proxy API can be a Simple Object Access Protocol (SOAP) Daemon 42 and is the primary interface into a database 60, which is the primary data store for the mobile office platform 24. The AggCron module 56 may also periodically initiate polling for new messages as well.

Figure 2:
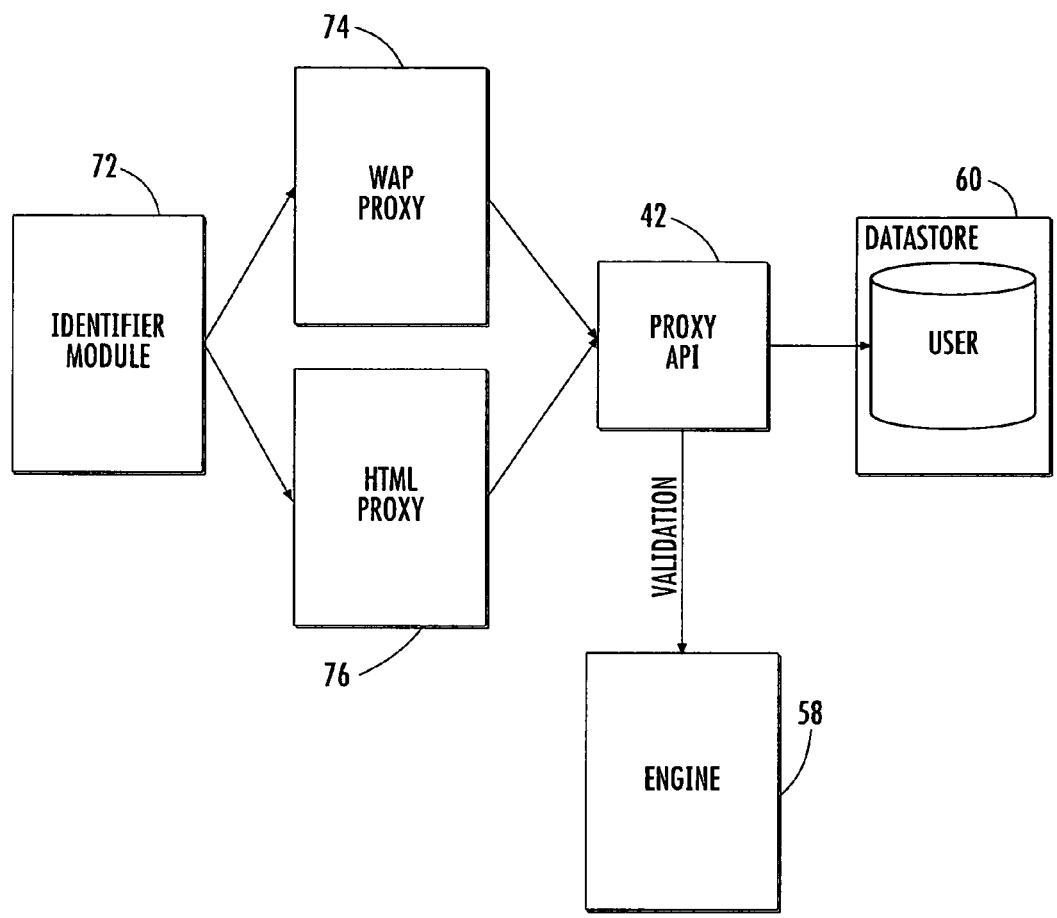
FIG. 2 is a schematic block diagram of an exemplary embodiment of user interface components of the direct access proxy of the system of FIG. 1.

FIG. 2 is a high-level block diagram showing user interface components of the direct access proxy 40. More particularly, the direct access proxy 40 illustratively includes an identifier module 72 with various downstream proxy modules for different communication formats, such as a Wireless Application Protocol (WAP) proxy module 74 and a Hypertext Markup Language (HTML) proxy module 76. Of course, it will be appreciated by those skilled in the art that other types of proxy modules for other communications formats may also be used.

The identifier module 72 provides a centralized authentication service for the direct access system 20 and other services. An authentication handshake may be provided between an ID service and direct access system 20 to ensure that users have the proper credentials before they are allowed access to the direct access system 20. The ability to switch from managing a Web client to a direct access system, or vice versa, may occur without requiring the user to re-enter any login credentials. Any Web client and direct access may share session management information on behalf of a user.

The WAP proxy 74 provides a wireless markup language (WML)-based user interface for configuring source mailboxes with the mobile office platform 24. The HTML proxy 76 provides an HTML-based user interface for configuring of source mailboxes in the MOP 24. The proxy API 42 (SOAP Daemon) is the primary interface into the database 60. The engine 58 is a protocol translator that connects to a source mailbox to validate configuration parameters. The database 60 is the primary user data store for the mobile office platform 24.

Figure 3:
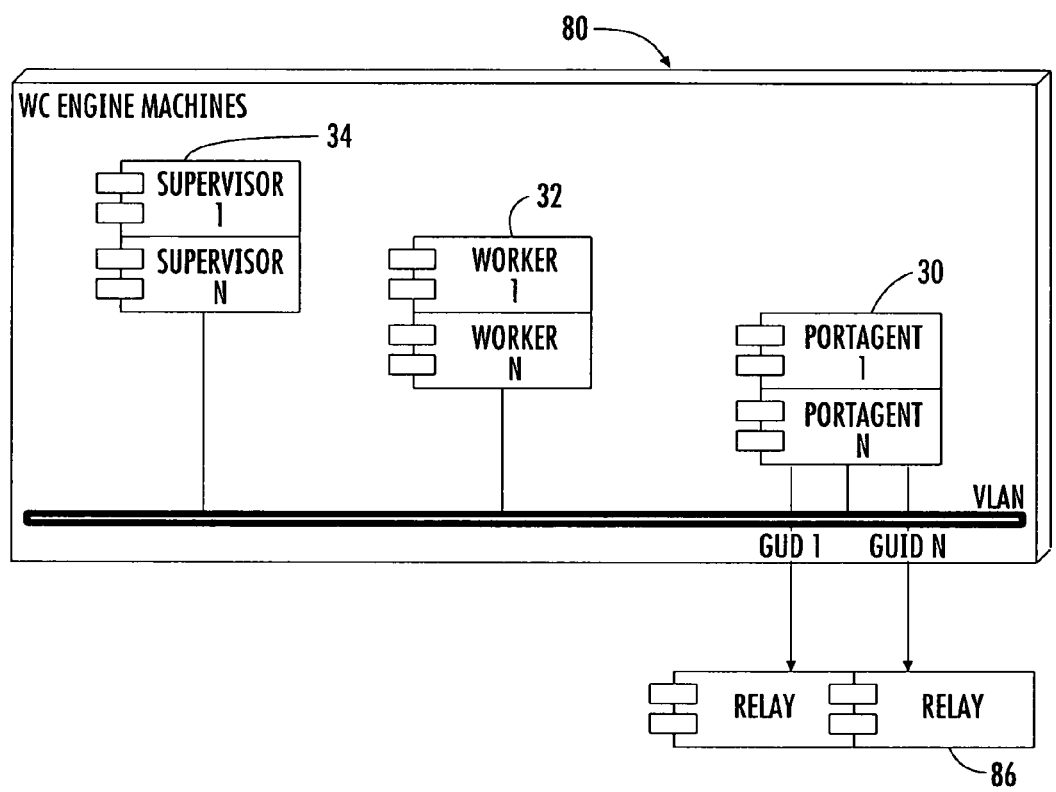
FIG. 3 is a schematic block diagram of an exemplary embodiment of the Web client engine of the system of FIG. 1.
Figure 4:
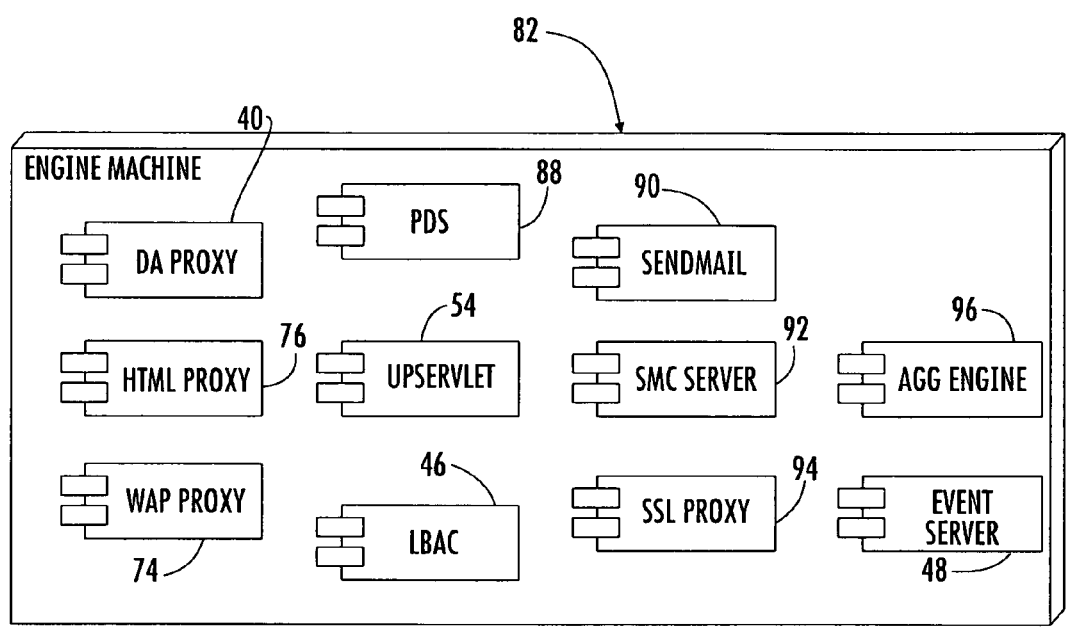
FIG. 4 is a schematic block diagram of an exemplary embodiment of the mobile office platform engine machine for use in the system of FIG. 1.
Figure 5:
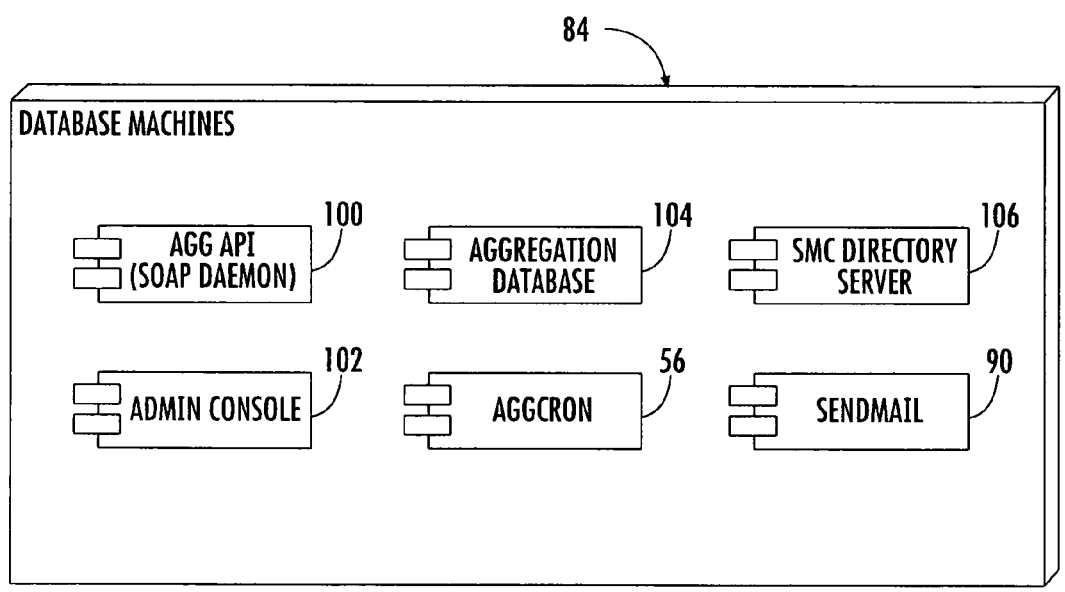
FIG. 5 is a schematic block diagram of an exemplary embodiment of the database module of the system of FIG. 1.

FIGS. 3, 4 and 5 illustrate respective Web client engine machines 80 (FIG. 3), an engine machine 82 (FIG. 4), and database machine 84 (FIG. 5). The Web client engine machine 80 illustratively includes the supervisors 34, workers 36, and port agents 38. Relays 86 cooperate with the port agents 38 using a GUID.

The engine machine 82 illustratively includes a direct access proxy 40, HTML proxy 76, WAP proxy 74, PDS module 88, UP Servlet 54, LBAC module 46, a sendmail module 90, an secure mail client (SMC) server 92, a secure sockets layer (SSL) proxy 94, an aggregation engine 96, and event server 48. The SMC server 92 cooperates with corresponding SMC modules resident on certain corporate networks, for example, to convey email data between the mobile office platform 24 and source mailboxes. The database machine 84 may include an aggregation application programming interface (API) 100 as a SOAP Daemon, an administration console 102, an aggregation database 104, the AggCron module 56, an SMC directory server 106, and a send mail module 90.

The various components of the Web client engine 22 may be configured to run on different machines or servers. The component binaries and configuration files may either be placed in a directory on the network or placed on a local disk that can be accessed to allow the appropriate components to run from each machine. In accordance with one exemplary implementation, deployment may include one supervisor, two workers, and one port agent for supporting 30,000 external source mailboxes, although other configurations may also be used. Actual production deployment may depend on the results of load, performance and stress testing, as will be appreciated by those skilled in the art.

For the mobile office platform 24 direct access components, modules and various functions, machines are typically installed in two configurations, namely engine machines (FIG. 4) and database machines (FIG. 5). While these machines may have all of the above-described components installed on them, not all of these components need be active in all applications (e.g., aggregation may be used with systems that do not support push technology, etc.). Once again, actual production deployment may depend on the results of load, performance and stress testing.

The mobile office platform 24 architecture in one known technique advantageously uses a set of device/language-specific extensible Stylesheet Language (XSL) files, which transform application data into presentation information. In one non-limiting example, a build process takes a non-localized XSL and generates a localized XSL for each supported language. When the XSL is used, it is "compiled" in memory and cached for repeated use. The purpose of pre-localizing and caching the templates is to reduce the CPU cycles required to generate a presentation page.

Branding may also be performed. Initially, a localized XSL may build a WAP application to access aggregated email accounts. A WAP proxy application may be localizable and support multiple WAP devices. For each logical page of an application, a device-specific XSL may be created, which may be localized for each language/country supported. This rendering scheme may support not only WAP devices, but also SMTP, HTML and POP proxies, for example. In branding, each page of a given application may be customized for each different brand.

The branding of a page may be accomplished through XSL imports, including the use of a Java application programming interface (API) for XML processing (JAXP) feature to resolve the imports dynamically. This need not require that each combined page/brand template be compiled and cached. By way of example, in a sample template directory, first and second pages for a single language/country may be combined with branded counterparts to generate a plurality of distinct template combinations. It is also possible to profile memory requirements of an application by loading templates for a single language, device/application and brand. An HTML device may include a set of templates that are large compared to other devices.

In one known technique, the mobile office platform 24 advantageously builds processes and takes non-localized files and language-specific property files and combines them to make each non-localized XSL into an XSL for each supported language. A separate XSL for each language need not be used, and the language factor may be removed from the memory usage equation. A JAXP API may be used to extend XSL with Java classes. The extensions may take various forms, for example, including extension elements and extension functions. A template may be transformed by creating and initializing an extension object with a locale and passing an object to a transformer. The system can remove multiple imports and use less memory. HTML templates can use template importing to enable template reuse, much like Java classes, and reuse other Java classes through a mechanism like derivation or importing.

In the direct access system 20, users receive email on their mobile wireless communications devices 25 from multiple external accounts, and when replying to a received message, the reply-to and sent-from address integrity is preserved. For example, for a user that has an integrated Yahoo! account (user@yahoo.com) and a POP3 account (user@pop3.com), if they receive an email at user@yahoo.com, their replies generated from the device 25 will appear to come from user@yahoo.com. Similarly, if a user receives an email at user@pop3.com, their replies will appear to come from user@pop3.com.

Selection of the "sent from" address is also available to a user that composes new messages. The user will have the ability to select the "sent from" address when composing a new message. Depending on the source mailbox type and protocol, the message may also be sent through the source mail service. This functionality can be supported by sending a configuration for each source mailbox, for example, as a non-limiting example, a service book for each source mailbox 51, 53 to the mobile wireless communications device 25.

As noted above, a service book is a class that may include all service records currently defined. This class may be used to maintain a collection of information about the device, such as connection information. The service book may be used to manage HTTP connections and mail (CMIME) information such as account and hierarchy. At mobile wireless communications devices 25, a delete service book request may be sent when a source mailbox 51, 53 is removed from the account. The service book may also be resent to the device 25 with a viewable name that gives the user some indication that the selection is no longer valid.

A sent items folder may also be "synchronized." Any device-originated sent messages may be propagated to a source account and stored in a sent mail folder, for example. Also, messages deleted on the device 25 may correspondingly be deleted from the source mailbox 51, 53. Another example is that device-originated marking of a message as read or unread on the device 25 may similarly be propagated to the source mailbox 51, 53. While the foregoing features are described as source-dependent and synchronizing one-way, in some embodiments certain synchronization features may in addition, or instead, propagate from the source mailbox/account to the handheld device, as will be appreciated by those skilled in the art.

When available, the mail service provider or corporate mail server may be used for submission of outgoing messages. While this may not be possible for all mail service providers or servers, it is preferrably used when available as it may provide several advantages. For example, subscribers to AOL will get the benefit of AOL-specific features like parental controls. Furthermore, AOL and Yahoo users, as non-limiting examples, will see messages in their sent items folder, and messages routed in this manner may be more compliant with new spam policies such as Sender Policy Framework (SPF) and Sender Id. In addition, messages sent via corporate mail servers 52 will have proper name resolution both at the global address list level and the personal level. It should be understood, however, that the use of the mail service provider 50 to deliver mail may be dependant on partner agreements and/or protocol, depending upon the given implementation.

The architecture described above also advantageously allows for features such as on-demand retrieval of message bodies and attachments and multiple folder support. Moreover, a "this-is-spam" button or indicator may be used allowing company labels and other service provider-specific features when supported by an underlying protocol, as will be appreciated by those skilled in the art.

One particular advantage of the direct access system 20 is that a user need not configure an account before integrating additional accounts. However, a standalone email address may be used, and this address advantageously need not be tied to a mailbox size which the subscriber is required to manage. For example, the email account may be managed by an administrator, and any mail could be purged from the system after a pre-determined period of time (i.e., time-based auto-aging with no mailbox limit for all users).

Additionally, all aspects of any integrated email account creation, settings and options may advantageously be available to the user from their mobile wireless communications device 25. Thus, users need not visit an HTML site and change a setting, create a filter, or perform similar functions, for example. Of course, an HTML site may optionally be used.

As a system Internet email service with the direct access system 20 grows, ongoing emphasis may advantageously be placed on the administrative site to provide additional information to carrier administrators, support teams, and similar functions. However, in some instances a mail connector may be installed on a personal computer, and this functionality may not always be available from the mobile wireless communications device.

The Web client engine 22 may advantageously support different features including message to handheld (MTH), message from handheld (MFH), forward/reply a message, request to view more for a large message (e.g., larger than 2K), request viewing message attachment, and over the air folder management (OTAFM). These functions are explained below.

For an MTH function, each email account integrated for a user is linked with the user device through a Web client service book. For each new message that arrives in the Web client user mailbox, a notification that contains the new message information will typically be sent to a Web client engine supervisor component (FIG. 3), which in turn will assign the job to an available worker with the least load in the system. The chosen worker 32 will validate the user information and retrieve the new message from the user source mailbox and deliver it to the user device.

In an MFH function, MFH messages associated with a Web client service book are processed by the Web client engine 22 and delivered to the Internet 49 by the worker 32 via the simple mail transfer protocol (SMTP) or native outbox. If a user turns on the option to save the sent message to the sent items folder, the direct access proxy will save a copy of the sent message to this folder.

In a Forward/Reply/More function, the user can forward or reply an MTH or MFH message from the mobile wireless communications device 25 as long as the original message still existed in the direct access proxy cache or in user mailbox. For MTH, the worker 32 may send the first 2K, for example, or the whole message (whatever is less) to the user device. If the message is larger than 2K, the user can request MORE to view the next 2K of the message. In this case, the worker 32 will process the More request by retrieving the original message from the user source mailbox, and send back the 2K that the device requests. Of course, in some embodiments more than 2K of message text (or the entire message) may be sent.

In an attachment-viewing function, a user can view a message attachment of a popular document format (e.g., MS Word, MS Power Point, MS Excel, Word Perfect, PDF, text, etc.) or image format (GIF, JPEG, etc). Upon receiving the attachment-viewing request, which is implemented in a form of the more request in this example, the worker 32 can fetch the original message from the user source mailbox via the direct access proxy, extract the requested attachment, process it and send result back to the user device. The processing requires that the original message has not been deleted from the user Web client mailbox.

In the save sent message to sent items folder function, if the user turns this option on, the worker 32 places a copy of each MFH message sent from the user device in the user sent items folder in the mailbox. In over the air folder management, the Web client OTAFM service maintains any messages and folders in the user mailbox synchronized with the user device over the air.

Whenever a message in the user source mailbox is Moved/Deleted, the associated message on the device may also be Moved/Deleted accordingly, and vice-versa. When a message is Moved/Deleted on the device, the associated message in the user Web client mailbox may also be Moved/Deleted accordingly. Similarly, when a folder is Added/Removed/Renamed from the user Web client mailbox, the associated folder on the device may be Added/Removed/Renamed, and vice-versa.

The system 20 may advantageously support different subsets of various messaging features. For example, in the message to handheld function, the mobile office platform 24 may be responsible for connecting to the various source mailboxes 51, 53 to detect new emails. For each new mail, a notification is sent to the Web client engine 22 and, based on this notification, the supervisor 34 chooses one of the workers 32 to process that email. The chosen worker will fetch additional account information and the contents of the mail message from the direct access proxy 40 and deliver it to the user device 25.

In a message sent from handheld function, the MFH could be given to the direct access proxy 40 from the Web client worker 32. In turn, the mobile office platform 24 delivers a message to the Internet 49 by sending through a native outbox or sending it via SMTP. It should be understood, however, that the native outbox, whenever possible, may provide a better user experience, especially when taking into account current anti-spam initiatives such as SPF and sender Id.

In a message deleted from handheld function, when a message is deleted from the device 25, the Web client engine 22 notifies the mobile office platform 24 via the direct access proxy 40. As such, the mobile office platform 24 can delete the same message on the source mailbox.

When handling More/Forward/Reply/Attachment viewing requests, the Web client worker 32 may request an original mail from the direct access proxy 40. It will then process the request and send the results to the mobile wireless communications device 25. The architecture may additionally support on-demand retrieval of message parts and other upgrades, for example.

Upon the integration of a new source mailbox 51, 53, the service book notification from the alert server 38 may be sent to the supervisor 34, which assigns this notification to a worker 32 for sending out a service record to the device. Each source mailbox 51, 53 may be associated with a unique service record. In this way, each MFH message is linked with a source mailbox 51, 53 based on the service record on the device.

The system 20 may also poll the integrated external mailboxes periodically to check for new mail and to access any messages. The system 20 may further incorporate optimizations for polling bandwidth from an aggregation component allowing a quick poll. The system 20 can also advantageously support a large active user base and incorporate a rapidly growing user base.

The topology of load balancing can be based on the size of a component's queue and its throughput. These load statistics can be monitored by a mechanism in one example called the UDP Heartbeat, as described before. If a component is overloaded or has a large queue size, the component will have less chance to get an assigned job from other components. In contrast, a component will get more assigned jobs if it completes more jobs in the last few hours than other components. With this mechanism, the load could distribute over heterogeneous machine hardware, i.e., components running on less power machines will be assigned fewer jobs than those on machines with more power hardware.

General load balancing for any mobile office platform components can be accomplished through the use of a load balancer module, for example, a BIG-IP module produced by F5 Networks of Seattle, Wash. BIG-IP can provide load balancing and intelligent layer 7 switching, and can handle traffic routing from the Internet to any customer interfacing components such as the WAP and HTML proxies. The use of a BIG-IP or similar module may provide the application with pooling capabilities, fault tolerance and session management, as will be appreciated by those skilled in the art.

Typically, access to a single source mailbox 51, 53 can be from a single direct access proxy 40 over a persistent connection. Any requests on behalf of a particular user could persist to the same machine in the same direct access clustered partition. As certain components are system-wide and will be handling work for users across many partitions, these components can be designed to determine which direct access partition to communicate with on a request-by-request basis.

The load balancer and cache (LBAC) 46 may support this function. The LBAC 46 is a system-wide component that can perform two important functions. The first of these function is that it provides a mapping from the device PIN to a particular direct access proxy 40, while caching the information in memory for both fast access and to save load on the central database. Secondly, as the direct access proxy 40 will be run in clustered partitions, the LBAC 46 may distribute the load across all direct access proxies within any partition.

The LBAC 46 can be formed of different components. For example, the code which performs the load balancing can be an extended version of a secure mail connector. The code can also perform lookups to the central database and cache the results (LBAC).

In one non-limiting example, when a worker requires that a direct access proxy 40 perform work, it provides the LBAC 46 with a device PIN. The LBAC 46 will discover which partition that PIN is associated with by looking in its cache, or retrieving the partition identifier from a central database (and caching the result). Once the partition is known, the LBAC 46 then consults its cache to see which direct access proxy in that partition has been designated to handle requests for that PIN. If no mapping exists, the LBAC requests the PDS to create a new association on the least loaded DA proxy 40 (again caching the result). Finally, the LBAC 46 responds to the worker 32 with the connection information for the proper direct access proxy to handle that particular request.

The secure mail connector 88 may run in failover pairs, where one is an active master and the other is a secondary standby. Internal data structures may be replicated in real-time from the master to the standby. Multiple LBACs 46 can be run for scalability and fault tolerance, but typically would require an external connection balancing component, such as the BIG-IP component as explained before.

A receiving component in the Web client engine 22 saves the job that has been assigned to it from other components to a job store on the disk before processing. It can update the status of the job and remove the job from the job store when the job processing is completed. In case of component failure or if the process is restarted, it can recover the jobs from the job store and, based on the current statuses of these jobs, continue processing these jobs to the next state, saving the time to reprocess them from the beginning.

Any recovery from the standpoint of MTH/MFH can be achieved through current polling behavior and on the Web client engine 22 recovery mechanisms. From within the mail office platform components, until a message has been successfully delivered to a Web client engine 22, that message is not recorded in the partition database 60. During the next polling interval, the system can again "discover" the message and attempt to notify the Web client engine 22. For new mail events, if an event is lost, the system can pick up that message upon receiving the next event or during the next polling interval. For sources supporting notifications, this interval could be set at six hours, as one non-limiting example. For messages sent from the Web client engine 22, and for messages that have been accepted by the Web client engine, recovery can be handled by different Web client engine components.

The Web client engine 22 may advantageously be horizontally and vertically scalable. Multiple supervisors 34 can be registered/configured with direct access proxies 40 to provide the distribution of the notification load and the availability of engine service. Multiple workers 32 and port agents 30 can run on the same machine or across multiple machines to distribute load and achieve redundancy. As the number of users grows, new components can be added to the system to achieve high horizontal scalability.

It is possible for a new component to be added/removed to/from the system automatically without down time. Traffic can automatically be delegated to a new component and diverted away from failed components. Each component within the mobile office platform 24 can be deployed multiple times to achieve horizontal scalability. To achieve vertical scalability, each mobile office platform 24 component can be a multi-threaded process with a configurable number of threads to scale under heavy load. Pools of connections can be used to reduce the overhead of maintaining too many open connections.

Figure 6:
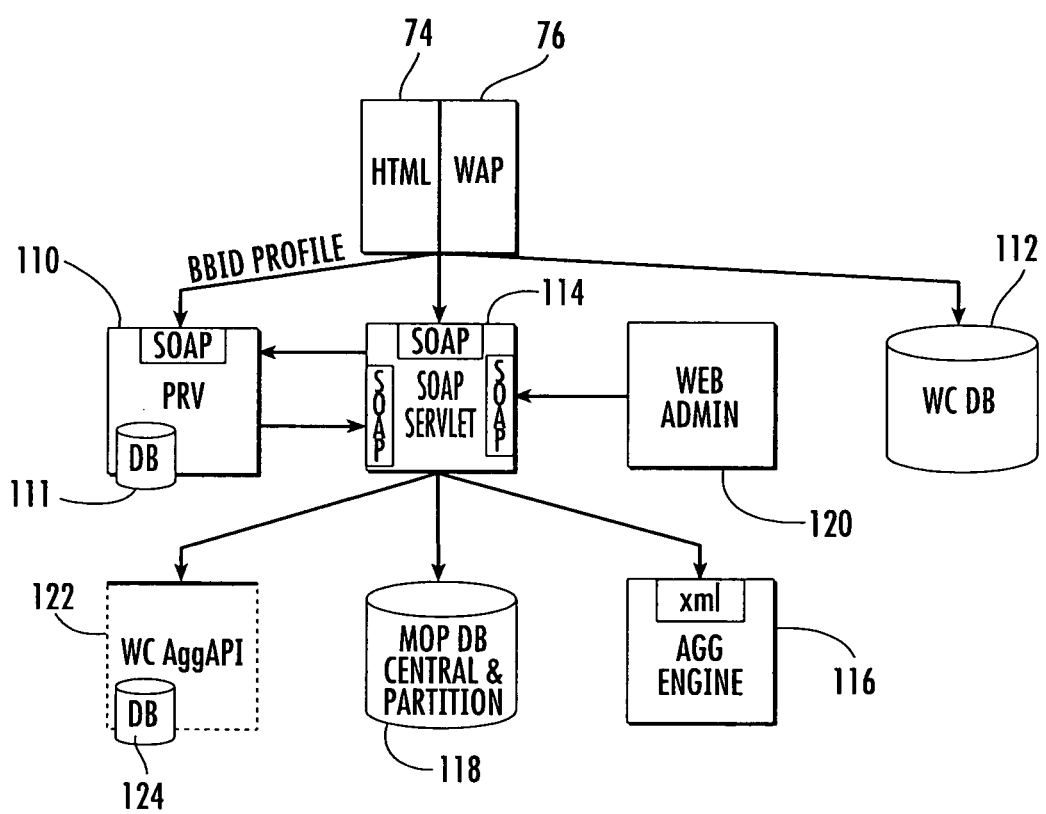
FIG. 6 is a schematic block diagram of another embodiment of user interface components of the direct access proxy similar to that shown in FIG. 2.

FIG. 6 is another embodiment of the high level architectural diagram of the BDA user interface components similar to the functional components shown in the diagram of FIG. 2. There will now follow a brief description of these basic components and their function.

Provisioning (PRV) 110 provides a centralized database 111 or store to access user and device Identifier (ID) profile information. During login, the WAP and HTML Proxies 74, 76 retrieve the ID profile, which provides user and device information. Proxies update PRV 110 for certain user configuration actions, such as a changed PIN. The web client database 112 (WC DB) contains account information for web client users. It is queried during login to determine if an unknown user is a web client user and whether they can be migrated. The WAP Proxy 74 provides a Wireless Markup Language (WML) based user interface for configuration of source mailboxes in the Mobile Office Platform (MOP). The HTML Proxy 74 provides an HTML based user interface for configuration of source mailboxes in MOP. The Soap Servlet 114 (SOAP Daemon) provides an interface into a database store. The Agg Engine 116 acts as a protocol translator that connects to a source mailbox to validate configuration parameters. The Mobile Office Platform Database (MOP DB) 118 is a primary user data store for the MOP. The Web Admin provides the MOP with notifications of account state changes. Provisioning 110 also provides notification of account state changes, such as inactive and active. Provisioning (PRV) can be used to notify and migrate a user from a Web Client (WC) service to an Internet Service (IS), having more advance features that are accessible from a web browser with a user email account, allowing a user to add and edit email accounts.

The Web Client Aggregation Programming Interface (WC AggAPI) 122 includes a database 124 and provides integrated source data for WC accounts. It is queried to retrieve integrated source configuration data to be migrated to a new Internet Service (IS) account for the user. The WC DB 112 provides web client account information. It is queried to retrieve web client account configuration data to be migrated to a Internet Service account for the user. The system can make use of existing products such as the Provisioning 110 and WebAdmin 120. These products have scaling characteristics. In this described embodiment, functionality has moved from Aggcron to the BDA proxy. The system provides a direct connection to a partition database within the BDA proxy. Access to the database can be from a configurable connection pool that will grow and shrink as necessary, depending on the needs of the system. The pool can recover from network errors and database connectivity issues.

Figure 7:
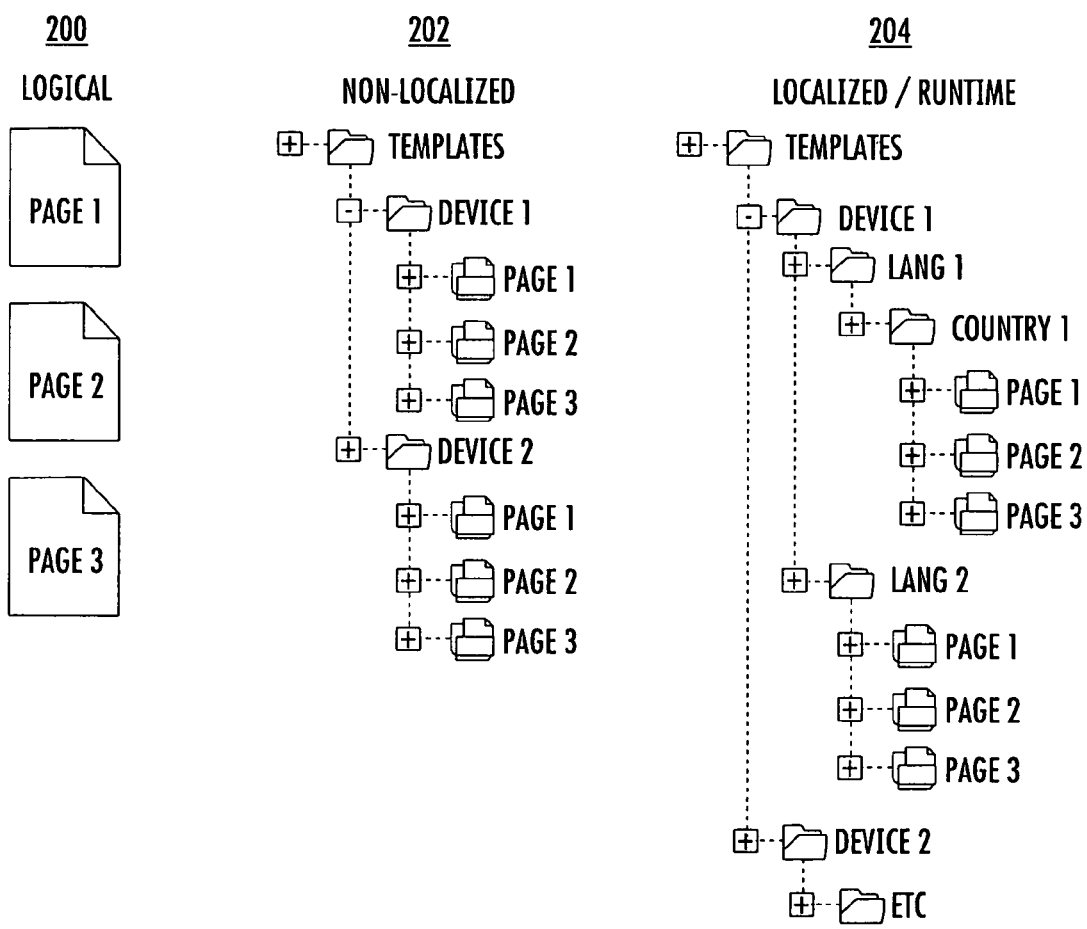
FIG. 7 is a block diagram showing a comparison of a logical structure for a non-localized and a localized/runtime structure as used in some known systems.

The DA System 10 is operative to allow a set of device/ language specific XSL files to transform application data into presentation information. A build process takes a non-localized XSL and generates a localized XSL for each language supported by the product as shown in FIG. 7. As illustrated, a logical pattern of three pages 200 is shown. A non-localized system 202 is shown with individual templates and different pages 1-3 in respective device 1 and device 2. A localized runtime system 204 is shown with devices, languages countries and pages. At runtime, when the XSL is used it is "compiled" in memory and cached for repeated use. The purpose of pre-localizing and caching the templates is to minimize the CPU cycles required to generate a presentation page.

The localized XSL scheme can build a WAP application to access aggregated email accounts, a.k.a. a WAP proxy, which can be localizable, but also support multiple WAP devices. For each logical page of the application, a device specific XSL can be created, which would be localized for each language/country supported.

Figure 8:
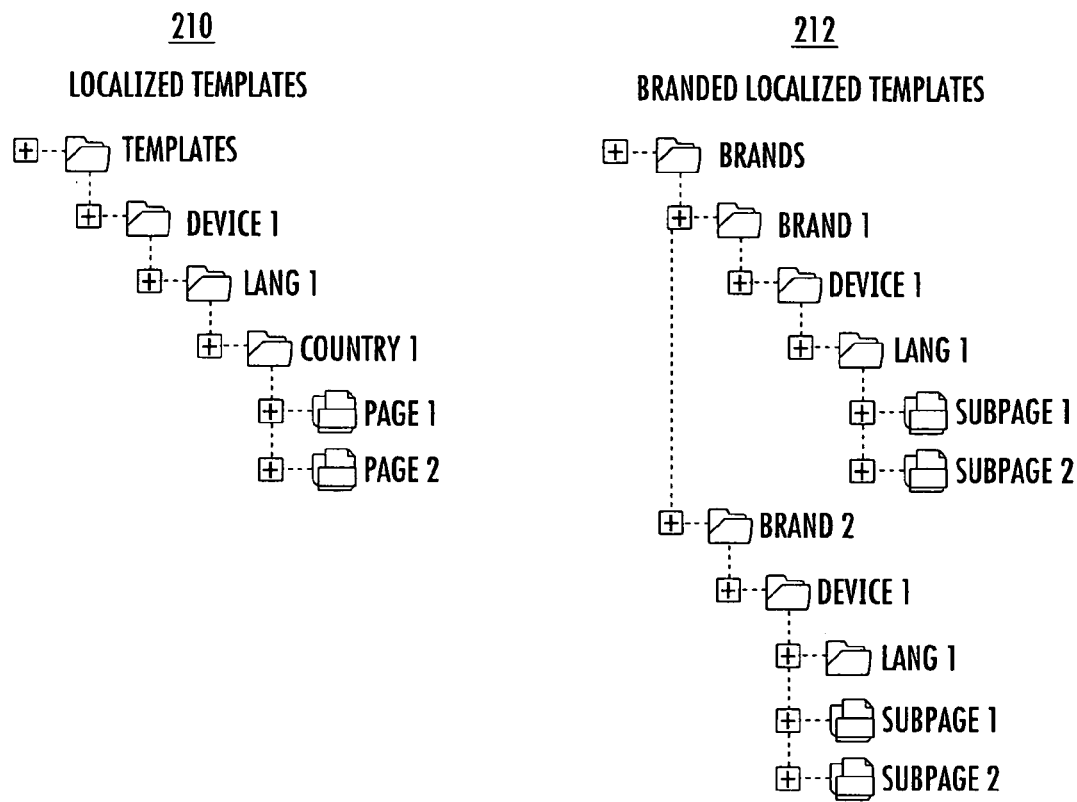
FIG. 8 is a fragmentary hierarchy view of localized templates versus branded localized templates as used in some known systems.

The rendering scheme does not have to support WAP devices, and an HTML and POP Proxy can be used. Furthermore, there are other applications defined for particular devices (e.g., Admin application for HTML). Branding is possible where each page of any given application can be customized for each different brand as shown in FIG. 8. As illustrated, localize templates 210 are shown and can be compared to the illustrated branded localized templates 212. The branding of a page can be done at runtime through XSL imports, using a JAXP feature to resolve the imports dynamically. This method does require that each combined page/ brand template be compiled and cached.

In the sample template directory shown above in FIG. 8, Page 1 and Page 2 for a single language/country would be combined with its branded counterparts to generate four distinct template combinations, as follows:

a) Device1/lang1/entry1/Page1/Brand1;
b) Device1/lang1/entry1/Page1/Brand2;
c) Device1/lang1/entry1/Page2/Brand1;
d) Device1/lang1/entry1/Page2/Brand1;

The DA System 10 supports five languages and some 20+ brands in one nonlimiting example, and the MOP 14. Any new devices/applications (e.g., HTML), localization and branding requirements would demand extra memory to cache pre-localized and branded templates. This is a large factor in the scaling of the proxies.

The memory requirements of an application can be profiled by loading all the templates for a single language, device/ application and brand. An HTML device can be used because it contains a set of templates that are large, compared to other devices.

One example of a profiler for use the system 10 is the Jfluid profiler operative with a NetBeans environment, which allows a comparison of memory usage to known and new systems. An application can read a proxy servlet action map to retrieve the location of templates used in the HTML Proxy. Xalan libraries can be loaded into memory by loading a template and a transformation can be performed. The profiler's results can be reset. The templates can be loaded and the profiler stopped. One non-limiting example of results are as follows:

1) 121 principal templates;
2) 44371672 bytes or about 42.3 megabytes;
3) 358 kilobytes per template;

In this example:

1) 147 unique templates were loaded (121 principal 26 imported);
2) 719 templates were loaded; and
3) A main.xsl was loaded 177 times.

The main.xsl file will be explained in detail below.

In this example, the following steps were performed:

1) Loaded/compiled a template;
2) Performed a transform;
3) Started a timer; and
4) Performed 1000 transformations of an XML document with the loaded template.

The template was of average size and contained 35 localized strings. The machine was a desktop box (2.8 ghz 500 mg). The results were 19.2 ms per transformation.

If the results for the HTML proxy were extrapolated into support of five languages and twenty brands, an HTML proxy running under a DA system 10 would require in this nonlimiting example, 20 brands*5 languages*42.3 megabytes=4.13 gigabytes.

The address space of a 32 bit processor may not accommodate the memory requirements. Furthermore, such memory requirements are not practical and could degrade the performance on the machines having the proxies. Adding more brands or languages could make those memory requirements grow steadily.

To reduce the memory requirements, the system could make the variables that calculate memory usage constant. The number of brands and/or languages used as a multiplying factor in calculating memory usage could be reduced.

Because template creation and caching can be designed in a way optimal for CPU usage, any reductions in memory usage could make the proxy faster, even though transformation times may increase. The description will proceed relative to XSLT as the rendering scheme, although other software programs known to those skilled in the art could be used.

A build process could take non-localized XSL's and language specific property files and combine them to make each non-localized XSL into an XSL for each supported language. A separate XSL for each language is possible and the language factor can be removed from the memory usage equation. In one example of the DA system 10, the HTML proxy would require about 20 brands*1 language-neutral*42.3 megabytes=846 megabytes. Adding a language typically should only require some constant memory increase depending on the language, and it would no longer be a multiplier. Thus, there can be runtime localization even though there is some variation.

Java applications typically use ResourceBundles to store language sensitive strings that will be viewed by a user. Any class file that requires a language sensitive string typically can load a ResourceBundle and retrieve it with a pre-defined ID. The data for a ResourceBundle could be contained within a property file or Java code. For property files a standard naming convention could be used for determining which property file to load for a particular language/locale. Some property files could be organized in a "resource" directory in subdirectories for each language, e.g., English(En) or French (Fr) as non-limiting examples. In each of those language directories there may be country subdirectories, e.g., US, UK. Each property file could be moved out of the language and country subdirectories and renamed such as:

Filename[_language[language[_country].property.

An example could be:

Resource\fr\mainmenu.xsl -> Resource\mainmenu__fr.xsl
Resource\en\uk\mainmenu.xsl -> Resource\mainmenu__en__uk.xsl XSL's could also obtain transform data from an XML document, but it could be prohibitive to retrieve all strings in all property files for a given language and convert them to XML, thus allowing the XSL to query the few strings that it requires. The (JAXP) can provide a mechanism for extending XSL with Java classes. It can support processing of XML documents using DOM, SAX, and XSLT. It enables applications to parse and particular XML processing implementation. The extensions can take two forms, 1) extension elements and 2) extension functions, such as Apache extensions. For purposes of the following description, extension functions will be explained.

When a template is to be transformed, an extension object instance can be created and initialized with a locale. This object is passed to a transformer. The XSL declares the extension function class and uses a value-of element to execute the function, passing it the extension object instance passed to it in the parameter.

A renderer, typically formed as a processor, could obtain the package where the ResourceBundles are stored. This can either be stored in a servlet configuration or hardcoded into code, such as:

ResourceBundlePackage="com.teamon.resource"

An extension function provides template access to ResourceBundles, such as:

```
Public ResLoader
    public ResLoader(Locale locale, String resPackage)
        m_locale=locale;
        public getString(String inbundle, String name)
            bundle=resPackage+bundle;
        ResourceBundle bundle =ResourceBundle.getBundle
(m_locale,bundle);
        bundle.getString(name);
```

The renderer could make the extension object instance available as parameter, such as:

```
ResLoader res=new Resloader(locale);
params.put("ResLoader",res);
transform.setParameters(params);
transform.process( );
```

An XSL file could define and use the extension object instance to load a string such as:

```
<Xsl:transform> attributes:
    xmlns:xalan=http://xml.apache.org/xalan
    xmlns:res="xalan://com.teamon.util.xml.ResLoader"
    extension-element-prefixes="res"
ResLoader Param:
    <xsl:param name="ResLoader"/>
localizing strings:
    <xsl:value-of
    select('res:getValue($ResLoader,"bundle","stringID"))/>
```

Naming the ResourceBundle in a getValue call may not match how templates currently specify where to find the resource strings. A different approach that mirrors that model could be to provide a loadResource extension function. The extension object could track which resources have been loaded and when a getValue( ) is called find the string in one of the loaded resources.

```
<xsl:value-of
    select('res:LoadResource($ResLoader,"foo"))/>
```

It is possible to use Thread Local Storage (TLS) instead of a parameter to store the extension object instance to simplify the value-of statement. This could be used in conjunction with variation a and a value-of statement could be:

```
<xsl:value-of select('res:getValue("stringID"))/>
```

An extension element used in conjunction with a TLS variation and the XSL could become more readable such as:

```
<res:getValue bundle="foo" name="stringID"/>
or
<res:loadResource name="foo"/>
<res:getValue name="stringID"/>
```

The system could organize the ResourceBundles in multiple packages. Anywhere the bundle is passed as an argument/attribute, the entire package can also be passed:

```
<xsl:value-of select('res:getValue($ResLoader,
"com.attachmate.resource.foo",stringID"))/>
```

A template as described could be modified using the variation as described, on a similar test as applied and a difference measured as a 19.4 ms average transformation. This is an increase of approximately 0.2 ms. Because there are 35 localized strings in this template, a per string overhead of approximately 0.005 ms average string load time can be inferred.

A profiler can be used to measure the time percentage spent loading the resource string. The results showed are 2.2% of the template transform time was spent loading the 35 strings. Any discrepancy could be the result of having only 50 transformations performed during profiling, rather than 1000 as a test application accomplishes.

As a result, the added overhead of calling an extension function does not overextend CPU usage and decreases memory usage.

In one non-limiting example, the process for migrating code and templates to a new system from a previously known system could include the following steps:

1. Move property files to source directory (e.g. com.teamon.resource) and change names to conform to ResourceBundle standards;
2. Add resource package directory configuration;
3. Create Extension function class;
4. Modify Renderer to create extension object instance and make available to template;
5. Modify caching scheme to cache based on template and brand and not language;
6. Create Migration utility for existing templates;
7. Replaces $xxx variables with the appropriate xsl element(s); and
8. If migration utility is not the localizer, the system removes the localizer from build.

Figure 9A:
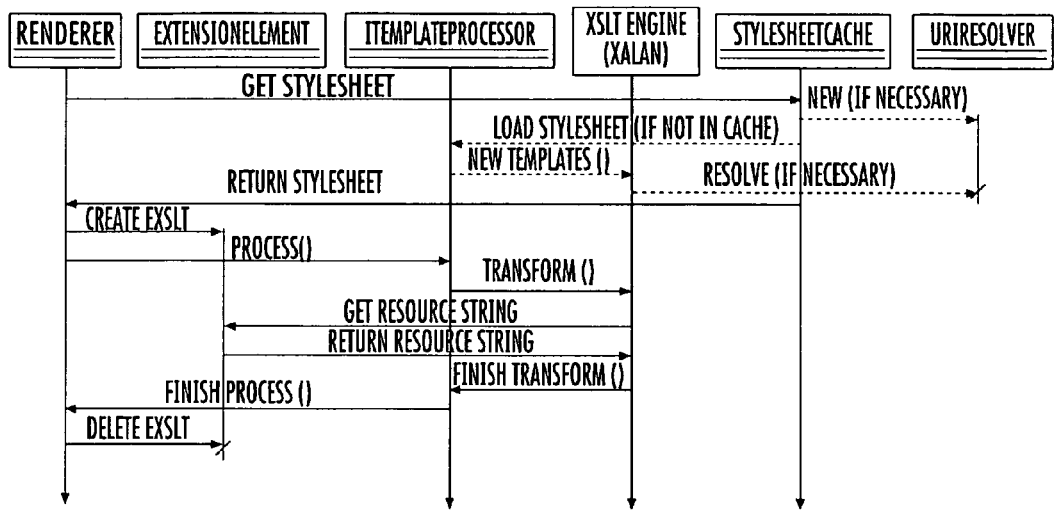
FIG. 9A is a sequence diagram specifying process flow for calling an extension object to retrieve a localized string.
Figure 9B:
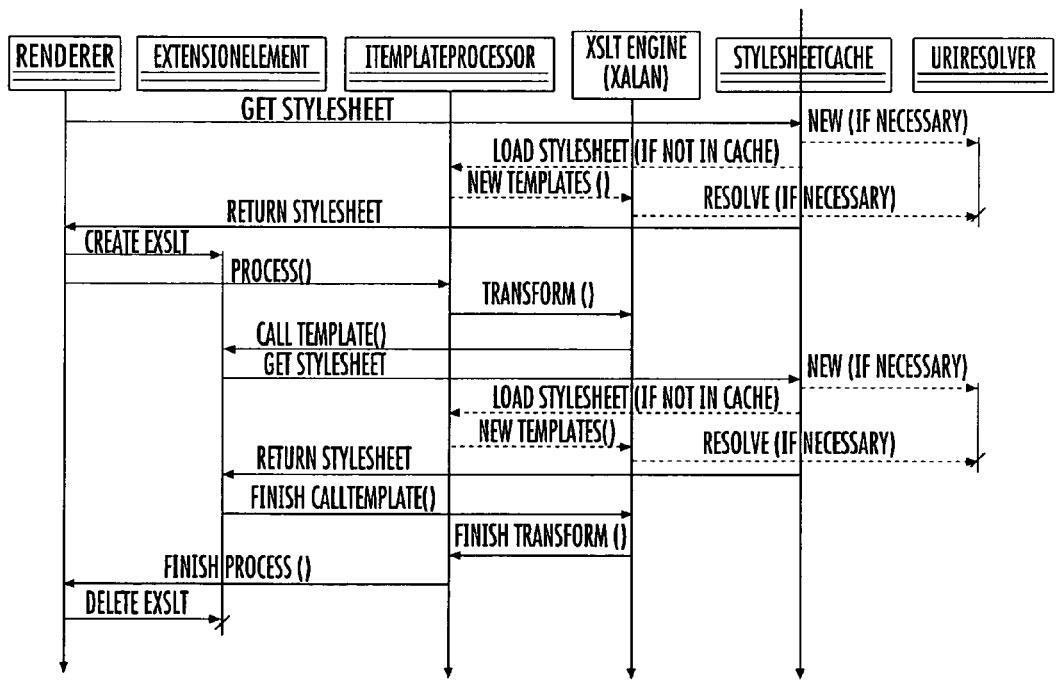
FIG. 9B is a sequence diagram specifying process flow for calling an extension object to execute an XSLT template.

FIGS. 9A and 9B are non-limiting examples setting forth process flow. FIG. 9A shows the process flow for calling the extension object to retrieve a localized string. FIG. 9B shows the process flow for calling an extension object to execute an XSLT template.

Figure 10:
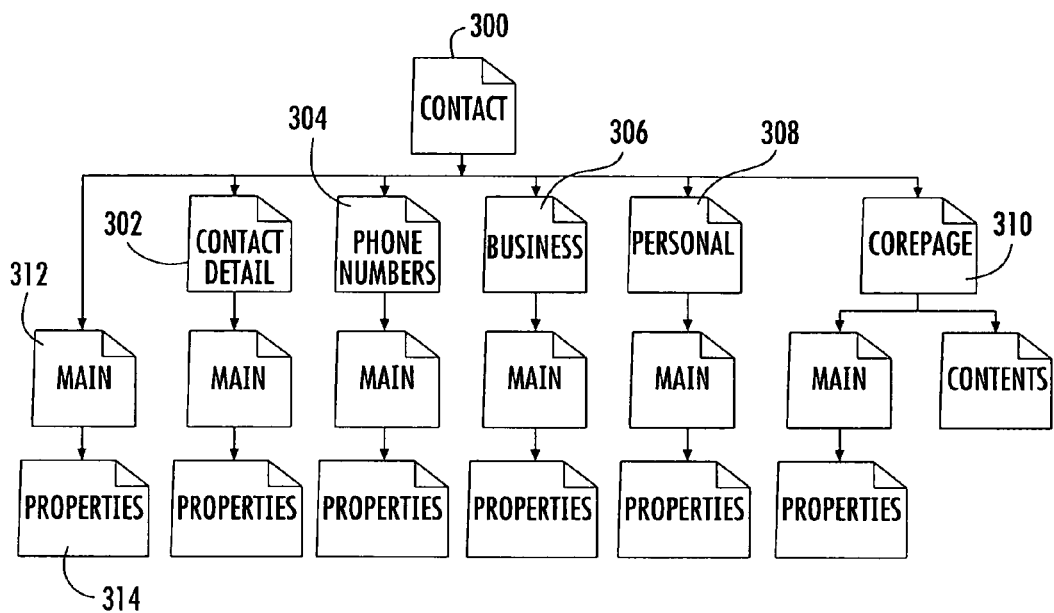
FIG. 10 is a fragmentary hierarchy view of an HTML proxy having different XSL files in a hierarchy as illustrated.

Within a principal template's import chain, some templates could be imported multiple times. Removing the multiple imports would typically use less memory. For example, in the HTML proxy there could be a XSL named contact.xsl, which could have the import structure depicted as in FIG. 10. As illustrated, contact 300 includes contact detail 302, phone numbers 304, business 306, personal 308, corepage 310, main 312 and properties 314. Two other files could include main.xsl and properties.xsl 314. Both main.xsl 312 and properties.xsl 314 could be imported a number of times, (for example, six) for the contact.xsl template in this example. The size of main and properties is approximately 110 k in this nonlimiting example. This template uses approximately 550 k(5×110) more memory than is actually required.

From the test application statistics noted above, it can be shown that two templates, main.xsl and properties.xsl, were both loaded 177 times, 88 of which were redundant. Profiling the memory usages of these templates showed that each instance required:

1) Main.xsl: 108 k*88=9.55 mb; and
2) Properties.xsl: 2.3 k*88=0.2 mb

Removing the redundancies from each template of the HTML proxy could reduce the memory requirements of this example brand by about 9.75 megabytes. If the same savings can be had for all brands, and the DA system 10 applies runtime localization, the memory requirements for the HTML proxy in the DA system is:

20 brands*1 lang-neutral*(42.3−9.75)megabytes=651 megabytes.

In this example, the principal template could import main.xsl. To ensure at runtime that redundancy does not occur, the template resolver can prevent multiple imports of branded templates by tracking which templates have been imported. If the template determines that a template is imported, it can return an empty imported template.

In the DA system 10, templates can be modified so only principle templates import main.xsl. The TemplateResolver can be modified to filter out redundant imports.

Because memory use could be extensive, the DA system 10 does not have to cache permanently every template, and caching does not have to occur in all events. This could increase transformation times by approximately one order of magnitude (19.2 ms to about 200 ms).

A smart cache could be operative with the system and could work in conjunction with a garbage collector program of the type known to those skilled in the art, which typically clears out objects that are taking up space in memory but are no longer in use by a program. One possible mechanism is to use weak references, but the system possibly would not decide which reference is to be released. It is possible however, to create a proxy work reference.

The Least Recently Used (LRU) cache 41 typically will release objects that were least recently used. A smart cache could use multiple factors:

3) Least Recently used;
4) How many times used;
5) How much memory it uses; and
6) How expensive it is to recreate.

The HTML templates could use template importing processes to enable template reuse, much like a Java Class reuses other Java classes through a mechanism like derivation or importing. The pages of the HTML proxy could be factored into its common pieces to enable reuse. This facilitates creation and maintenance of the HTML user interface. The memory usage however, is not the same as reusable Java classes, and each principal template has its own classloader and loads its own copy of a reused template into memory. Many copies of the same template could be cached in memory at the same time. For example, the template main.xsl could be imported by 88 principal templates, and therefore, at least 88 copies of it may exist in memory at the same time.

By using a single in-memory copy of non-principal templates, this significantly reduces memory usage within a brand. It may also reduce memory usage within a brand depending on the amount of common templates.

Table I analyzes memory usage when each template is loaded in memory a single time. Using the HTML proxy and an example brand, a profiler was used to determine the memory size of templates that are loaded more than once. It was then possible to calculate the memory savings. Table I contains examples of the templates loaded more than once and the memory data associated with it.

thus possible to recalculate the memory usage requirements in a DA system 10 as:

20 brands*1 lang-neutral*(42.3−39.6)megabytes=54 megabytes.

The memory usage will be less if there is any template sharing across brands.

The DA System 10 can have a single instance of a template in memory, but the standard xsl:import or xsl:include elements preferably should not be used because the templates to be reusable are like Java classes. It is also possible to use Xalan-Java Extensions. An Xalan-Java Extensions element allows a template to call a Java method with the transformation context and return content. From within the Java method, other templates can be called, passing along the transformation context, and return the transformation result as the extensions result. By doing this each stylesheet is never imported as part of another template. Rather, it is cached separately and can be reused by all templates that require it.

Using the extension element to call templates may limit the ways in which templates may be used. For instance, non-principal templates cannot make use of <xsl:apply-templates>. This may result in slightly less succinct, manageable, reusable code. As an example <xsl:template match="text( )">, could match all text nodes within an element. The match could be more complicated than text( ). A system can use Xpath queries to make complex matching less complicated. An Xpath query such as <xsl:apply-templates select="pd: provider/[@protocol='pop']"> is more intuitive than having the template itself use <xsl:if> to accomplish the same task. Xsl:apply-templates may not require the system to have knowledge of the exact structure of an XML document. It is more flexible than, for example, <xsl:for-each> and more resilient to changes in the source XML structure. This may not be a significant problem in the MOP because the input XML is typically known.

<Xsl:import> provides inheritance loading of templates. If there is more than one imported stylesheet, the one that is

TABLE I

| Stylesheet | Load count | Size (bytes) | Total (count * size) |
|---|---|---|---|
| brand:\\main.xsl | 177 | 112760 | 19958520 |
| brand:\\properties.xsl | 177 | | |
| corepage.xsl | 71 | 196416 | 13945536 |
| contents.xsl | 71 | | |
| brand:\\helptemplates.xsl | 31 | 191272 | 5929432 |
| wizard\mainshell.xsl | 25 | 32552 | 813800 |
| Brand:\\pwptemplates.xsl | 7 | 6824 | 47768 |
| addressbookfolder\phone_numbers.xsl | 4 | 55696 | 222784 |
| addressbookfolder\personal.xsl | 4 | | |
| addressbookfolder\business.xsl | 4 | | |
| settingsoptions.xsl | 4 | | |
| addressbookfolder\corpcontact_footer.xsl | 3 | 24600 | 73800 |
| addressbookfolder\contact_footer.xsl | 3 | | |
| addressbookfolder\contactlist.xsl | 2 | 199600 | 399200 |
| addressbookfolder\contact_detail.xsl | 2 | | |
| format_utils.xsl | 2 | | |
| addressbookfolder\corpcontactlist.xsl | 2 | | |
| Totals | | 8197200.8 mb | 4139084040.4 mb |

From an analysis of Table I, it is evident that the memory usage across redundantly loaded templates is about 40.4 mb. If each of those templates were only loaded once, it requires about 8 megabytes (mb), saving approximately 39.6 mb. It is imported first has a lower import precedence than the one that is imported second, which has lower import precedence than the third, and so on. Also, the <xsl:apply-imports> element is used to apply any definitions and template rules of the imported stylesheet has been overridden by the importing stylesheet. The existing stylesheets do not use this functionality because there are no occurrences of <xsl:apply-imports>. The XSLT 1.0 standard would define extension elements, but it may not define an implementation, which could vary. For an XSL stylesheet to be portable across implementations, it must appropriately check for the availability of an extension element before assuming that it can be used. If the extension element is unavailable, it must provide a fallback mechanism. Because the desired template caching behavior cannot be implemented in pure XSL, we become somewhat tied to Xalan as the system's XSLT processor. This should not be a significant limitation because the two main Java XSLT processors, Xalan and Saxon, both are similar in their implementation and most other processors are likely to use something similar. Hence, switching XSLT processors might not be a significant time sink.

There are different models that can reuse a template via an extension element. There could be separate transforms in which the DOM (Document Object Model) is passed to the processor and, a new transformer and output stream is created. A DOM is a system in which a document is viewed as a collection of objects which can be individually referenced, thereby allowing for the manipulation of the presentation of the document, for example, by the use of Java Script or some other language in the case of a Dynamic HTML document. Dynamic HTML is similar. The result of the transform is returned as the result of the extension function. This model would typically use standard JAXP interfaces, and other templates within the XSL can be called or applied (e.g. match). Some detriment could me an intermediate result buffer and extra buffer copies, a no call-template without modifying template with root dispatcher, and no parameter passing.

In a single transformer model, the called template element is passed to the calling templates transformer and executed within its context. The result of the transformer is written directly to the caller's output stream. This model has no intermediate result buffer, and supports parameter passing. Some detriments could be that it uses non-JAXP Xalan interfaces, other templates within the XSL cannot be called directly, and each template should be written like a self-contained method.

XSL stylesheets typically do not use the standard <xsl:import> or <xsl:include> top-level elements, given the implementation of an extension element. They could be replaced with an extension element, which could be implemented by a helper object that is responsible for providing a "call-template" method and a "resource-string" method as explained above. An example of extension object pseudo-code is shown below.

```
public class XSLTExtension
{
    public void call-template(XSLProcessorContext context, ElemExtensionCall extElem)
    {
        String href = extElem.getAttribute("href");
        String name = extElem.getAttribute("name");
        Templates stylesheet = getStylesheetCache( ).getStylesheet(href);
        ElemTemplate template = stylesheet.getTemplateComposed( );
        TransformerImpl curtrans = (TransformerImpl)context.getTransformer( );
        execute(curtrans, template, extElem);
    }
    public String resource-string(XSLProcessorContext context, ElemExtensionCall extElem)
    {
```

-continued

```
        String bundle = extElem.getAttribute("bundle");
        String resKey = extElem.getAttribute("resource");
        ResourceBundle resBundle = ResourceBundle.getBundle(bundle, getLocale( ));
        return resBundle.getString(resKey);
    }
}
```

A TLS field could be used to store the object to simplify calling of the extension element from the XSL code.

The renderer can compile stylesheets and hold them in memory, improving runtime performance. Each principal stylesheet is compiled and cached in the Renderer. The cache can be keyed by the brand and name of the stylesheet file. Individual templates, for example, XSL code blocks between <xsl:template> elements could be cached. The caching mechanism stores compiled templates and enables access to them by a unique key. This key could be the combined resolved stylesheet file name+template name. The resolved file name could be computed by logic in a TemplateResolver class. The current "back-off logic" can be retained; e.g., if a template is called from brand://stylesheet.xsl, the system would look in the current brand and if not found, then it could look in the default brand. Following is an example pseudocode for the renderer and resolver:

Renderer.java

```
public class Renderer
{
    public boolean render( OutputStream os,
                InputSource is,
                javax.xml.transform.sax.SAXSource source,
                Map xslParams,
                String xsltPath,
                String brand,
                String protocol,
                String device,
                Locale locale)
    {
        Object stylesheet= getStylesheet(brand, protocol, device, locale, xsltPath);
        if (stylesheet != null) {
            return processor.process(stylesheet, source, is,os, xslParams);
        }
        return false;
    }
    public Object getStylesheet(String brand, String protocol,
                                  String device, Locale locale, String xsltPath)
    {
        File f = getStylesheetAsFile(xsltPath, protocol, device);
        String key = brand + f.getPath( );
        return StylesheetCache.get(key);
    }
}
```

Resolver.java

```
public class Resolver
{
    private String getStylesheet(String href)
        throws FileNotFoundException
    {
        String brandsToTry[ ] = {m_brand, "default"};
        for (int i = 0; i < brandsToTry.length; i++) {
            String path = getPathToStylesheet(href, brandsToTry[i]);
```

-continued

Resolver.java

```
        File f = new File(path);
        if (f.isFile( ) && f.exists( ))
            return f.getName( );
    }
    throw new FileNotFoundException( );
}
public Source resolve( String href, String base )
    throws TransformerException
{
    ...
}
```

In order to support extension elements and replacement of <xsl:import> and <xsl:include>, existing stylesheets can be changed as part of a migration process. For example, occurrences of <xsl:import> and <xsl:include> can be removed altogether. Occurrences of <xsl:call-template> could be replaced with a call to <exslt:call-template name="foo" href="file://file-containing-foo.xsl">. (The 'href' attribute may be omitted in cases where the called template is in the same file.) The system deduces what the 'href' value ought to be. In some cases it could be "file://somefile.xsl", and in some cases it could be "brand://somefile.xsl", and in some cases it could be "wap://somefile.xsl".

There are a few non-principal stylesheets that could contain references to global variables. The following example lists English files only:

```
WEB-INF\templates\m31\default\en\mailfolder\exitcall.xsl
WEB-INF\templates\voice\default\en\mailfolder\message_impl.xsl
WEB-INF\templates\voice\default\en\mailfolder\newmessage_impl.xsl
WEB-INF\templates\voice\default\en\mainmenu\applicationmenu_impl.xsl
WEB-INF\templates\voice\default\en\mainmenu\providermenu_impl.xsl
WEB-INF\templates\wap\basic\en\mailfolder\calresperror_impl.xsl
WEB-INF\templates\wap\basic\en\mailfolder\plainmessage.xsl
WEB-INF\templates\wap\basic\en\mailfolder\showsubfolder_impl.xsl
WEB-INF\templates\wap\basic\en\mainmenu\error_impl.xsl
WEB-INF\templates\wap\basic\en\mainmenu\noaccess_impl.xsl
WEB-INF\templates\wap\basic\en\mainmenu\pwperror_impl.xsl
WEB-INF\templates\wap\basic\en\mainmenu\suspended_impl.xsl
WEB-INF\templates\wap\basic\en\pendingjob_impl.xsl
WEB-INF\templates\wap\bbdata\en\mailfolder\calresperror_impl.xsl
WEB-INF\templates\wap\bbdata\en\mailfolder\plainmessage.xsl
WEB-INF\templates\wap\bbdata\en\mailfolder\showsubfolder_impl.xsl
WEB-INF\templates\wap\bbdata\en\mainmenu\applicationmenu_impl.xsl
WEB-INF\templates\wap\bbdata\en\mainmenu\error_impl.xsl
WEB-INF\templates\wap\bbdata\en\mainmenu\noaccess_impl.xsl
WEB-INF\templates\wap\bbdata\en\mainmenu\pwperror_impl.xsl
WEB-INF\templates\wap\bbdata\en\mainmenu\suspended_impl.xsl
WEB-INF\templates\wap\bbdata\en\pendingjob_impl.xsl
WEB-INF\templates\wap\blackberry\en\mailfolder\calresperror_impl.xsl
WEB-INF\templates\wap\blackberry\en\mailfolder\plainmessage.xsl
WEB-INF\templates\wap\blackberry\en\mailfolder\showsubfolder_impl.xsl
WEB-INF\templates\wap\blackberry\en\mainmenu\applicationmenu_impl.xsl
WEB-INF\templates\wap\blackberry\en\mainmenu\error_impl.xsl
WEB-INF\templates\wap\blackberry\en\mainmenu\noaccess_impl.xsl
WEB-INF\templates\wap\blackberry\en\mainmenu\pwperror_impl.xsl
WEB-INF\templates\wap\blackberry\en\mainmenu\suspended_impl.xsl
WEB-INF\templates\wap\blackberry\en\pendingjob_impl.xsl
WEB-INF\templates\wap\up3\en\error\timeout_impl.xsl
WEB-INF\templates\wap\up3\en\mainmenu\error_impl.xsl
WEB-INF\templates\wap\up3\en\mainmenu\noaccess_impl.xsl
WEB-INF\templates\wap\up3\en\mainmenu\pwperror_impl.xsl
WEB-INF\templates\wap\up3\en\mainmenu\suspended_impl.xsl
WEB-INF\templates\wap\up3\en\pendingjob_impl.xsl
WEB-INF\templates\wap\up\en\mailfolder\calresperror_impl.xsl
WEB-INF\templates\wap\up\en\mailfolder\plainmessage.xsl
WEB-INF\templates\wap\up\en\mailfolder\showsubfolder_impl.xsl
WEB-INF\templates\wap\up\en\mainmenu\applicationmenu_impl.xsl
WEB-INF\templates\wap\up\en\mainmenu\error_impl.xsl
WEB-INF\templates\wap\up\en\mainmenu\noaccess_impl.xsl
WEB-INF\templates\wap\up\en\mainmenu\pwperror_impl.xsl
WEB-INF\templates\wap\up\en\mainmenu\suspended_impl.xsl
WEB-INF\templates\wap\up\en\pendingjob_impl.xsl
```

These follow a similar pattern:

```
<xsl:variable name="isM3L" select="false( )"/>
<xsl:template name="blackberry_plainmessage">
...
    <xsl:choose>
        <xsl:when test="not(boolean($isM3L))">
            ...
        </xsl:when>
        <xsl:otherwise>
            ...
        </xsl:otherwise>
    </xsl:choose>
...
    <xsl:if test="$isM3L">
        <card id="tovoice">
            <p>
                <xsl:element name="tovoice">
                    <xsl:attribute name="href">
                        <xsl:value-of select="..." />
                    </xsl:attribute>
                </xsl:element>
```

These can be changed during the migration process. Pertinent XSL test switches (xsl:if, xsl:when, etc.) and a Multimodal Markup Language (M3L) proxy can be removed, with the code resulting in the test evaluation of 'true' or 'false' depending on the value of the 'isM3L' variable. In some non-principal templates the value is always 'false', and the test should be evaluated likewise.

There are a few occurrences of <xsl:apply-templates> in non-principle templates as follows in which English files are listed:

```
WEB-INF\templates\voice\default\en\calendarfolder\calendarfolder_impl.xsl
WEB-INF\templates\voice\default\en\mailfolder\mailfolder_impl.xsl
WEB-INF\templates\voice\default\en\mainmenu\providermenu_impl.xsl
WEB-INF\templates\wap\basic\en\addressbookfolder\contacts_impl.xsl
WEB-INF\templates\wap\basic\en\addressbookfolder\corporatecontacts_impl.xsl
WEB-INF\templates\wap\basic\en\calendarfolder\calendarfolder_impl.xsl
WEB-
```

-continued

INF\templates\wap\basic\en\mailfolder\mailfolder_impl.xsl
    WEB-
INF\templates\wap\basic\en\mainmenu\applicationmenu_impl.xsl
    WEB-
INF\templates\wap\basic\en\mainmenu\providermenu_impl.xsl
    WEB-
INF\templates\wap\bbdata\en\addressbookfolder\contacts_impl.xsl
    WEB-
INF\templates\wap\bbdata\en\addressbookfolder\corporatecontacts_impl.xsl
    WEB-
INF\templates\wap\bbdata\en\calendarfolder\calendarfolder_impl.xsl
    WEB-
INF\templates\wap\bbdata\en\mailfolder\mailfolder_impl.xsl
    WEB-
INF\templates\wap\bbdata\en\mainmenu\applicationmenu_impl.xsl
    WEB-
INF\templates\wap\bbdata\en\mainmenu\providermenu_impl.xsl
    WEB-
INF\templates\wap\blackberry\en\addressbookfolder\contacts_impl.xsl
    WEB-
INF\templates\wap\blackberry\en\addressbookfolder\corporatecontacts_impl.xsl
    WEB-
INF\templates\wap\blackberry\en\calendarfolder\calendarfolder_impl.xsl
    WEB-
INF\templates\wap\blackberry\en\mailfolder\mailfolder_impl.xsl
    WEB-
INF\templates\wap\blackberry\en\mainmenu\applicationmenu_impl.xsl
    WEB-
INF\templates\wap\blackberry\en\mainmenu\providermenu_impl.xsl
    WEB-
INF\templates\wap\up\en\addressbookfolder\contacts_impl.xsl
    WEB-
INF\templates\wap\up\en\addressbookfolder\corporatecantacts_impl.xsl
    WEB-
INF\templates\wap\up\en\calendarfolder\calendarfolder_impl.xsl
    WEB-INF\templates\wap\up\en\mailfolder\mailfolder_impl.xsl
    WEB-
INF\templates\wap\up\en\mainmenu\applicationmenu_impl.xsl
    WEB-INF\templates\wap\up\en\mainmenu\providermenu_impl.xsl Each of these listed cases generally follows a pattern similar to the following:

--- addressbookfolder\contacts_impl.xsl

```
<xsl:template name="up_contacts">
...
    <xsl:apply-templates mode="up_contacts"/>
...
</xsl:template>
<xsl:template match="a:response" mode="up_contacts">
    <xsl:if test="a:propstat/a:prop/a:contentclass[. =
'urn:content-classes:person']">
        <xsl:element name="option">
        ...
        </xsl:element>
    </xsl:if>
</xsl:template>
```

---

These cases could to be migrated. There are at least two options:

(1) Inline the code. In essence, replace with:

--- addressbookfolder\contacts_impl.xsl

```
<xsl:template name="up_contacts">
...
<xsl:for-each select="a:response">
    <xsl:if test="a:propstat/a:prop/a:contentclass[. = 'urn:content-classes:person']">
        <xsl:element name="option">
        ...
        </xsl:element>
    </xsl:if>
</xsl:for-each>
...
</xsl:template>
```

---

(2) Replace <xsl:apply-templates> with <xsl:for-each . . . ><tmon:call-template></xsl:for-each>. In essence, replace the above with:

--- addressbookfolder\contacts_impl.xsl

```
<xsl:template name="up_contacts">
...
    <xsl:for-each select="a:response">
        <tmon:call-template name="up_contacts_helper"/>
    </xsl:for-each>
...
</xsl:template>
<xsl:template name="up_contacts_helper">
    <xsl:if test="a:propstat/a:prop/a:contentclass[. = 'urn:content-classes:person']">
        <xsl:element name="option">
        ...
        </xsl:element>
    </xsl:if>
</xsl:template>
```

---

It is possible to append "_helper" to the template name. This can avoid conflicts with existing template already named "up_contacts".

Both the Renderer and the Extension Element implementation typically require access to stylesheets, which can be cached after being resolved and loaded to improve performance. The caching mechanism is abstracted behind an Interface. The initial implementation of the caching will be a storage and retrieval in a Map. "Smart" caching as described above is possible. An example of a caching interface is:

---

```
public interface StylesheetCache
{
    Templates get(String brand, String protocol, String device,
String xsltPath);
}
```

---

It is possible to store loaded stylesheets in a Hashtable keyed by the stylesheet's path. The Processor is used to obtain a compiled stylesheet if one was not found in the Hashtable storage.

Simple Stylesheet Cache:

---

```
public SimpleStylesheetCache implements StylesheetCache
{
    private Hashtable m_cache = new Hashtable( );
    Templates get(String brand, String protocol, String device,
String xsltPath)
    {
        String path = getPath(brand, protocol, device, xsltPath);
        Templates stylesheet = m_cache.get(path);
        if (stylesheet == null) {
            stylesheet = processor.loadStylesheet(path);
```

```
            m__stylesheets.put(path, stylesheet);
        }
        return stylesheet;
    }
}
```

The Uniform Resource Identifier (URI) resolver is not required in migrated templates since they will no longer require xsl:import or xsl:include. They could be removed entirely.

It is also possible to use the system as described for images. An image is a localizable resource just as a ResourceBundle is. The same algorithm to resolve a ResourceBundles location can be applied to locating an image file. Furthermore, a caching scheme could be used to store the results of the resolution. For example, given a local zh_zn, a default locale en_us and the extension element could be:

```
<exslt:getResourceImg path="a\b\c\images"
    id="welcome.gif">
```

A resolved image URI cache could be checked in order for the following keys:

```
a\b\c\images\zh\zn\welcome.gif
a\b\c\images\zn\welcome.gif
a\b\c\images\en\us\welcome.gif
a\b\c\images\en\welcome.gif
a\b\c\images\welcome.gif
```

For each key, the system can find the key in the cache and the key's value could be returned by the extension element. If it does not exist in the cache, the file system can be checked if the image file exists. If the file exists in the file system, the key can be written to the cache with a value equal to the key. The previous checked keys can also be written to the cache with the same value. For example, if welcome_zn.gif is found, then the image URI cache will contain:

```
a\b\c\images\zh\zn\welcome.gif, a\b\c\images\zn\welcome.gif
a\b\c\images\zn\welcome.gif, a\b\c\images\zn\welcome.gif
```

The template migration could allow all instances of:

```
<img src="a\b\c\images\welcome.gif"/>
``` to be replaced with:

```
<exslt:getResourceImage path="a\b\c\images"
    id="welcome.gif"/>
```

This could be relatively straightforward to execute as a step during the migration process. The image files can be left in the same locations as a result, no migration process is necessary to move or rename the image files.

Figure 11:
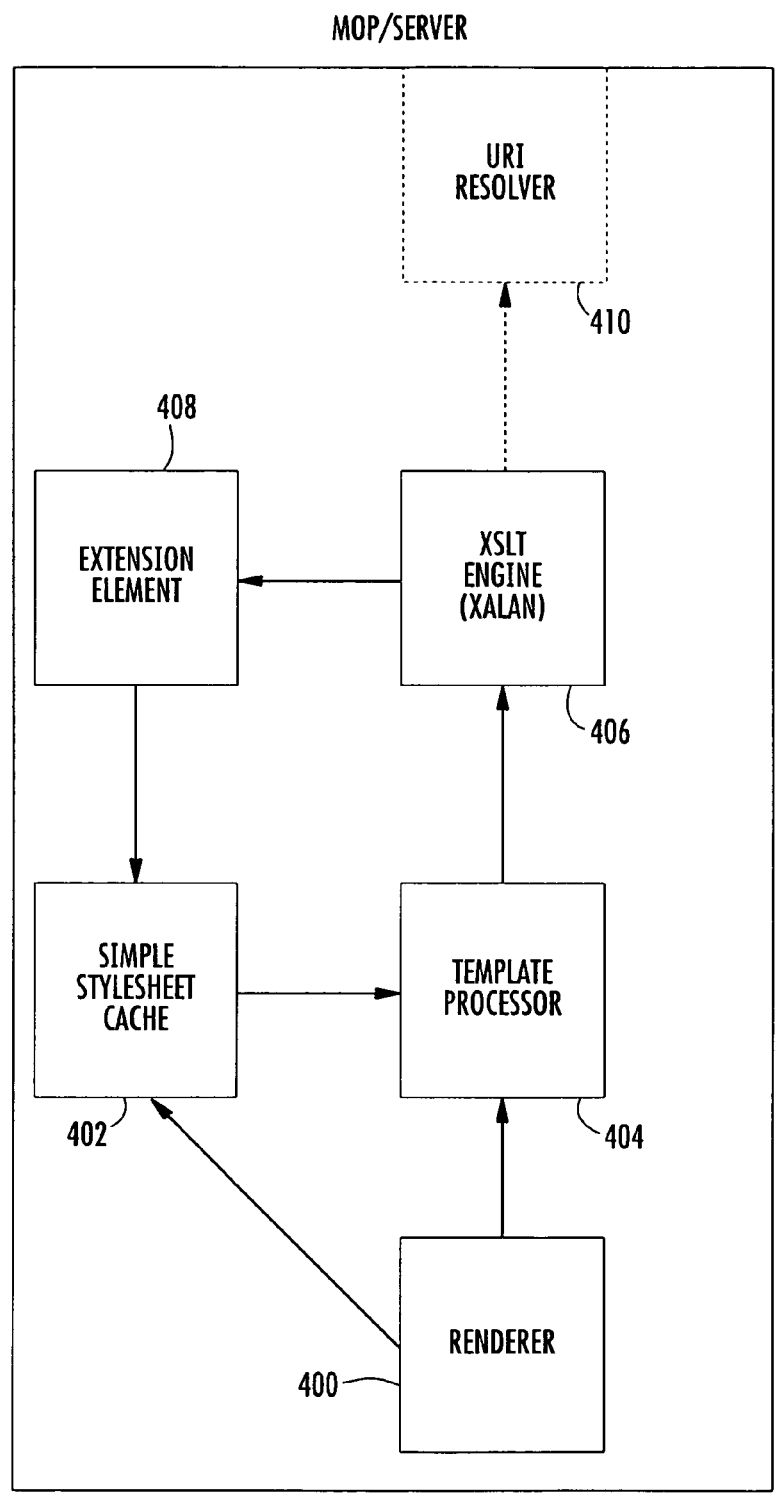
FIG. 11 is a block diagram of different components in the system used in the template rendering (transformation) for transforming application data into presentation information.

FIG. 11 is a block diagram showing the relationship between the components in the template rendering (transformation) process after introduction of an extension element logic. As illustrated, the functional components can be part of a larger server or mobile office platform. The renderer 400 is operative with a simple style sheet cache 402 and a template processor. An XSLT engine (XALAN) receives inputs from the template processor and outputs to the extension element 408, which is operative with the simple style sheet caches. The XSLT engine can be operative with a URL resolver, 410 which is not required, since there is no longer a requirement for <xsl:import> or <xsl:include>. It may still be left in place, and thus is depicted in dashed lines. The Extension Element module is called by the Xalan engine. The Renderer 400 pulls the requested template from the Simple Stylesheet Cache 402 and hands to the Template Processor 404 for processing. The Template Processor 404 still has two methods, one to load a template, used by the Stylesheet Cache 402 and one for processing a transformation, used by the Renderer 400. The Stylesheet Cache 402 is separated out into its own module, and is used by both the Renderer 400 and the Extension Element.

Figure 11A:
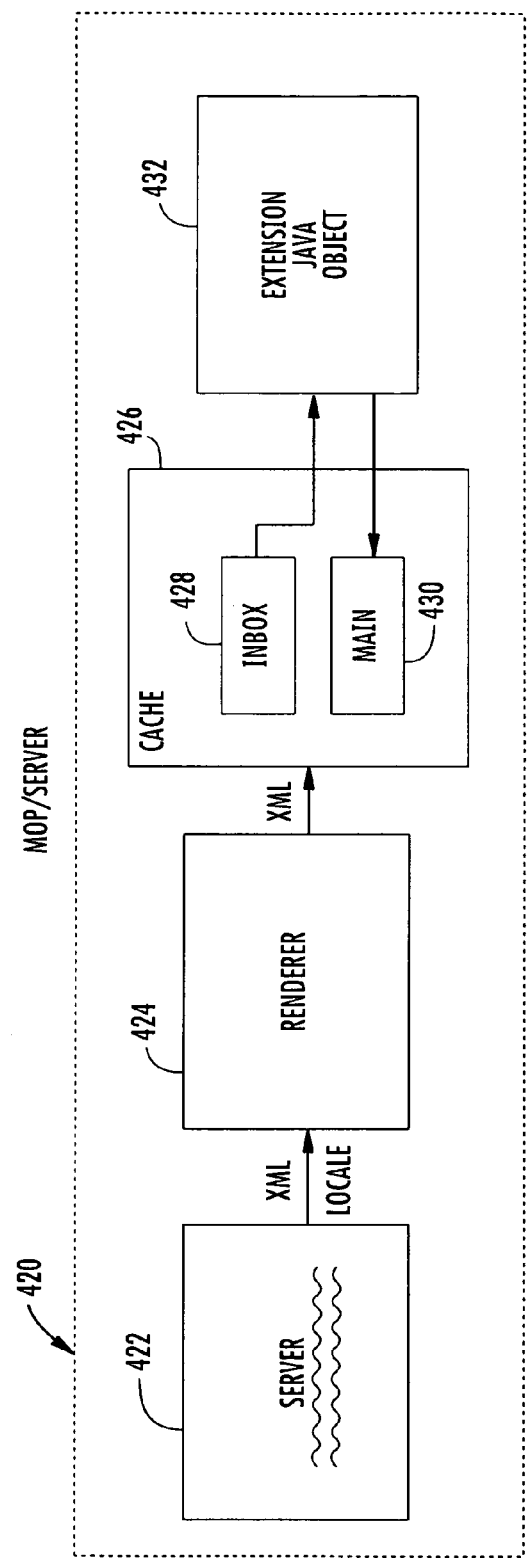
FIG. 11A is another block diagram of an example of the components that can be used in the template rendering (transformation).

FIG. 11A shows another block diagram similar to FIG. 11 of a MOP/server 420. The components for rendering a template can include a server 422, renderer 424, cache 426, with an inbox 428 and main cache 430, and extension Java object 432.

In accordance with one non-limiting embodiment, the system supports multiple languages and multiple carriers and brands. The MOP code-base can support these requirements. In previous systems, there had been no formal process, however, for adding new carriers or languages outside of the MOP archive, build and push. Updates can be done by pushing out the new language resource files and new brand specific resource files to the proxies. The system formalizes a process that enables new languages and carriers to be deployed efficiently without requiring component restarts. A system and process is provided for the storage and dynamic deployment of carrier and language specific resources.

The system meets various functional requirements. It can dynamically deploy new languages. It allows a more simple process for deploying a new language bundle to a running installation, without requiring the component to be restarted. This does not include the updating of an existing carrier or language. The system can dynamically deploy new carriers. It allows a simple process for introducing a new carrier bundle to a running installation, without requiring the component to be restarted. The system allows a centralized access to a carrier bundle. It can provide a mechanism to retrieve and inspect a carrier bundle through a centralized service. Deployment can be centralized via a service, requiring low human interaction e.g., operations are not required to telnet to each proxy in the system and perform some action.

The system has performance, reliability and scalability. There is no single point of failure. Resource bundles can be replicated and accessible from multiple service instances. Additional loads to existing components can be minimized. Additional traffic to the network can be minimized.

The MOP has resource structure that supports a set of java resource bundles and a set of images (gifs,jpgs). These non-brand specific strings are stored in different packages, following java resource bundle file naming conventions for multiple locales.

Resource bundles for XSLT can be located in a package for com.teamon.resources, containing all text that is resolved at template translation time. Resource bundles for Proxy Injectors can be located logically within the proxy packages that use them, containing all localized text that is resolved during action handler execution. The text is injected into an XML document, which will be processed by an XSLT to generate localized content.

The following is a non-limiting example of a list of existing non-brand specific bundles.

```
com.teamon.proxy.resource\prov.properties
com.teamon.proxy.resource\proxy.properties
com.teamon.proxy.html.resource\html.properties
com.teamon.proxy.html.resource.ppc\prov.properties
com.teamon.proxy.webdav.bda.resource\bda.properties
com.teamon.proxy.webdav.davmgmt.resource\davmgmt.properties
com.teamon.proxy.admin.resource\admin.properties
com.teamon.proxy.pop.resource\pop.properties
com.teamon.proxy.wap.resource\wap.properties
```

Additionally, for example, the Tmobile brand can have additional resource bundles that override three of the common ones listed above:

```
com.teamon.proxy.resource.tmobile\prov.properties
com.teamon.proxy.webdav.davmgmt.resource.tmobile\davmgmt.properties
com.teamon.proxy.resource.tmobile\proxy.properties
```

When loading a named text string within a named bundle, the system code can use the following package precedence order to load the string.

1. com.teamon.proxy.[app].resource.[device].[bundle]
2. com.teamon.proxy.[app].resource.[brand].[bundle]
3. com.teamon.proxy.[app].resource.[bundle]
4. com.teamon.proxy.resource.[device].[bundle]
5. com.teamon.proxy.resource.[brand].[bundle]com.teamon.proxy.resource.[bundle]

A brand can be formed as templates, images, java resource bundles and terms and conditions. Brand resources can be located within the configured brand directory, under which there is a particular subdirectory for each brand e.g. [BrandDir]\mobile.

Templates can be defined. A particulate brands subdirectory (e.g. tmobile) contains subdirectories for each application (e.g. html) under which there may be one or more device subdirectories (e.g. blackberry). Templates found in these directories will override those found in the configure template directory. They may also exist additional templates that extend the base application functionality (of course this implies new actions/code. There are images within the brand's directory there is a single image directory called "images" containing localized images. Java Resource Bundles can be included. A brand may override certain proxy injected strings by providing a brand specific bundle.

Currently localized terms and conditions for the wireless communications device provider and the carrier are located within a Direct Access (BDA) subdirectory of the brand. Each terms and conditions is a text file with a hardcoded names, e.g.:

```
[branddir]\[brand]\bda\en\termsandconditions.txt
[branddir]\[brand]\bda\en\carriertandc.txt
```

Each brand can be configured, in the database, with a particular scheme. Schemes are located with a proxy configured scheme directory. Scheme directories contain non-localized cascading stylesheet (CSS) files, and localized images. Schemes may be shared by multiple brands.

A Resource Deployment Package (RDP) can be used to deploy any number of languages and/or carriers/brands. Each deployment package contains enough information to identity its contents and deployment instructions.

Figure 12:
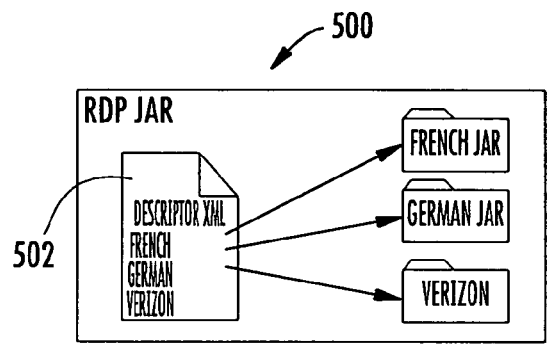
FIG. 12 is a high-level block diagram of a resource deployment package and showing a descriptor and subsets of French, German and a carrier resource.

The RDP can be likened to a jar, which contains language and/or carrier resources. The jar allows the system to organize the resources and compress them for efficient deployment. The RDP contains a descriptor file and a set of resource jars. The descriptor file contains information about each resource jar to be deployed. A resource jar contains all the resources for a particular language or carrier and contains the path information so it can be easily expanded into the resource consumers file system. FIG. 12 shows a RDP at 500 that includes a description 502 with references to French language 504, German language 506 and a Verizon or Carrier file 508 as a non-limiting example.

The descriptor file contains XML, which contains deployment information for each resource jar within the RDP. An example of the schem of the RDP descriptor file is:

```
<?xml version="1.0" encoding="utf-8" ?>
<xs:schema targetNamespace=""
xmlns:xs="http://www.w3.org/2001/XMLSchema">
    <xs:element name="package">
        <xs:complexType>
            <xs:sequence>
                <xs:element name="Resource">
                    <xs:complexType>
                        <xs:attribute name="id" type="xs:ID" />
                        <xs:attribute name="type" type="ResourceType" />
                        <xs:attribute name="jar" type="xs:string" />
                        <xs:attribute name="description" type="xs:string" />
                        <xs:attribute name="dirPropKey" type="xs:string" />
                    </xs:complexType>
                </xs:element>
            </xs:sequence>
        </xs:complexType>
    </xs:element>
    <xs:simpleType name="ResourceType">
        <xs:restriction base="xs:string">
            <xs:enumeration value="language" />
            <xs:enumeration value="carrier" />
        </xs:restriction>
    </xs:simpleType>
</xs:schema>
```

A resource element describes one resource jar within the RDP, and can have the following attributes:

| Attribute | Type | Description |
| --- | --- | --- |
| id | ID | Uniquely identifies a resource jar. Each version of a particular language or carrier resource jar should always have the same id e.g. Each version of the French language resource jar should always have the same id. |
| type | ResourceType | This value should either be "language" or "brand". |
| jar | string | The name of the resource jar within the RDP. |
| description | string | A human readable string describing the resource jar e.g. "French Language" |
| dirPropKey | string | The name of the property who's value is the name of the directory in which the resource consumer should expand the jar into e.g. "com.teamon.proxy.schemes" |

An example descriptor.xml for the language French follows.

```
<package>
    <resource id="lang-fr" type="language" jar="fr"
    description="French"
        dirPropKey="teamon.proxy.resources.dir"/>
```

```
          <resource id="lang-fr-tmo" type="language" jar="fr-tmobile"
              description="French TMobile"
              dirPropKey="teamon.proxy.resources.dir"/>
        </package>
```

An example descriptor.xml for the carrier/brand verizon follows.

```
<package>
   <deploy type="brand" id="br-verizon" jar="verizon" desc="Verizon
   wireless"
       dirProp="teamon.proxy.brand.directory"/>
</package>
```

An example RDP contents for the French language follows.

```
rdp001.jar
   descriptor.xml
   fr.jar
      admin__fr.properties          com.teamon.resources
      bda__fr.properties            com.teamon.resources
      blackberry__fr.properties     com.teamon.resources
      calendar__fr.properties       com.teamon.resources
      common__fr.properties         com.teamon.resources
      defaultbrand__fr.properties   com.teamon.resources
      tmobile__fr.properties        com.teamon.resources
   fr__tmobile.jar
      prov.properties               com.teamon.proxy.resource.tmobile
      davmgmt.properties
                                    com.teamon.proxy.webdav.davmgmt.
      resource.tmobile
proxy.properties     proxy.propertiescom.teamon.proxy.resource.tmobile
```

The following use cases can be implemented as non-limiting examples.
1. New Resources: A new language or carrier needs to be added to the system.
2. Added component: A new instance of a component is added to the system, it has little or no resources, it must be able to retrieve any missing resources.
3. Re-started component: A component is down and re-started. While down it missed one or more new resource notifications. It must now get those resources.
4. Where is my brand: If an account is of carrier/brand X and that brand's resources are not present, then they are retrieved.
5. Updated Resources: A language or carrier resource has been modified requiring a resource to be redeployed, during running system or maintenance.
6. Version consistency across components: If a new version of a resource is introduced, we should make sure that we do not end up with different instances having different versions of resources.

An external system/process can provide an RDP to a resource deployment service within the IS system. That component makes available the resources to ensure that each component of the system is made aware of the resource. To ensure a timely push of the resource those components must be notified of the resource's existence or be polled often enough to be timely. Notifications would require that each interested party is known. Polling would require more network resources. However, with a purely polling approach there may be no need for a Primary Deployment Service.

Whenever a component is added to the system or has been re-started, there exists a chance that it does not have the required resources. In this case the component should be able to synchronize with the currently deployed updates. Such a process can be used to update resources during maintenance windows (shutdowns), when re-starting from a failure, when a brand resource is missing or if polling is employed for new resource detection.

A given resource should not differ from one component to another. Since it is not a requirement to update resources on the fly and because the system uses java resource bundles, which do not provide a refresh mechanism, once a particular resource is deployed, an updated resource typically should not be available. The only way to update a resource will be during system down times via a specific mechanism.

There now follows a description of the components and process of deploying an RDP.

Figure 13:
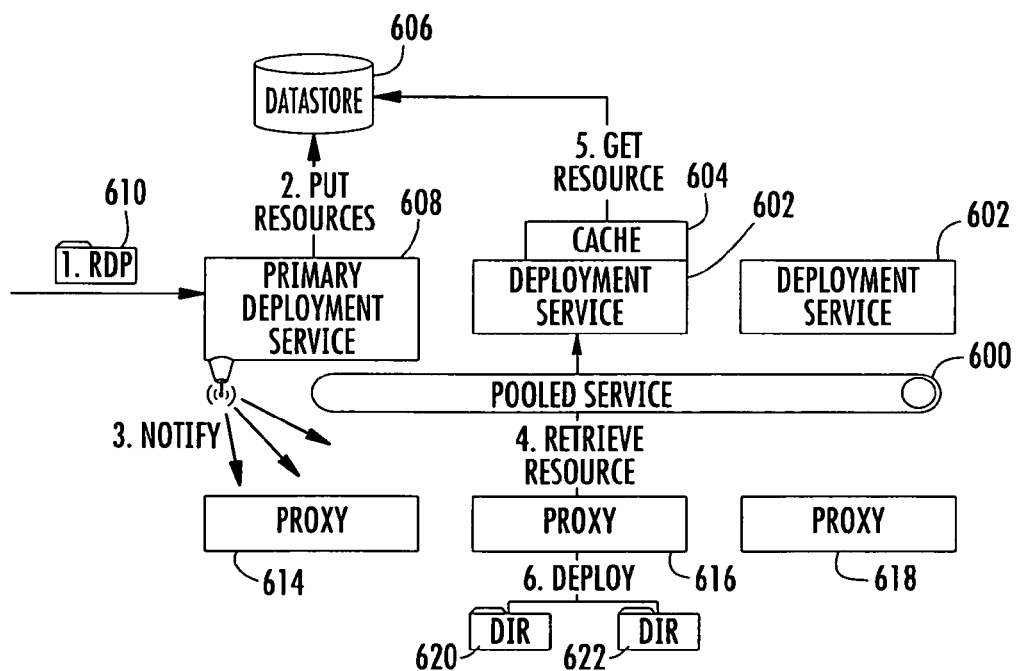
FIG. 13 is a high-level block diagram of components that can be involved in resource deployment and a high-level process flow for resource push.

FIG. 13 illustrates a non-limiting example of the components involved in resource deployment and a typical high level process flow for a resource push. The basis components are shown as a pooled service 600, which is operable with a deployment service 602 and cache 604, and data store 606. A deployment service can include primary, secondary and "cache" only. When a resource consumer has been notified of a new resource or has determined via a synchronization process that it needs to retrieve a resource, it connects to a deployment service via load balancer (Big IP) that will load balance the request to one of the deployment services. A primary deployment service 608 receives signals from an RDP 610 as illustrated. The pooled service 600 is operable with the deployment service 602. Three proxies 614, 616, 618 are operable with the pooled service 600. Two directories 620, 622 are shown and can be deployed with the service.

An example of a set of sequence steps follow.
1. An RDP is constructed and sent to the Primary Deployment Service.
2. The Deployment Service saves the resources in the RDP to the database.
3. The Deployment Service notifies all interested proxies of the new resources.
4. The Proxy retrieves the resource via the pooled deployment service.
5. The deployment service checks its cache for the requested resource and if not available retrieves from the DB and caches it. Lastly the resource in returned.

The proxy deploys the resource.

At some point, an RDP is created, which will then be sent to the Primary Deployment Service (DS), perhaps via a console, script or utility application. Two mechanisms could be considered for delivery of the RDP to the Primary DS:
  (1) The client tool recopies the RDP to a known deployment directory. The Primary DS detects the RDP and begins the deployment process; and
  (2) The client tool uses a WebDav interface implemented by the Deployment Service to send the RDP, which starts the deployment process.

Figure 14:
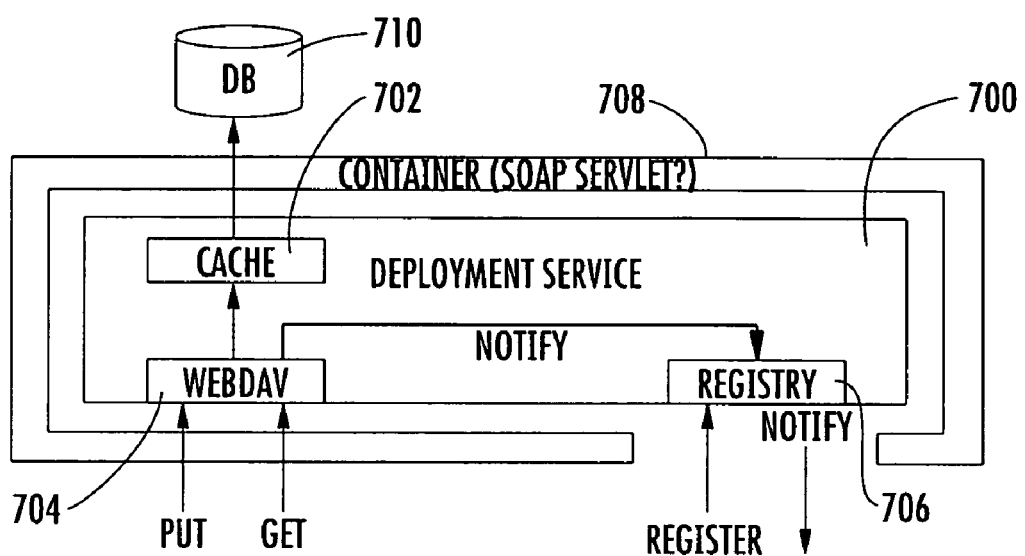
FIG. 14 is a block diagram showing a deployment service that can be used in a non-limiting embodiment.

The Deployment Service (DS) is responsible for receiving RDPs, Persisting resources, notifications to interested components, retrieving resources, and providing synchronization info. Basic non-limiting components are illustrated in FIG. 14, for example, the Deployment service 700, with a cache 702, WebDAV 704 and registry 706 and container 708, and database 710.

The container 708 provides an environment for the DS to execute. In this case, a Soap Servlet is the most likely candidate as it can provide an HTTP listener for WebDAV request and a pool of DB connections. Since it is a pooled resource, the DS becomes a pooled resource as well.

The cache stores resources locally with the service. If the request resource does not exist in the cache then it is retrieved from the DB. The resources are stored in a configured directory as RDP's. An index is also created that tracks which resources are in the cache. The cache also provides a mechanism that returns a set of existing resources, which will require a query to the DB. This will enable synchronization request to be processed.

The container is configured to route WebDAV request to the DS. The WebDAV component processes the request, which can be one of three:
(1) Put RDP. Stores RDP in local cache and in the DB. Notifies registry.
(2) Retrieve Resource. Given a resource key the resource is retrieved.
(3) Synchronize. Prop Find on root folder returns a list identifying available resources. The list will include the resources id and its version id. The client will use this info to determine which resources it must download.

Each component interested in receiving new resources, must register with the Primary DS. Registration is merely keeping a socket open via which notifications can be sent. A notification will consist of a WebDAV URI to retrieve an RDP. The client should use a scheme similar to the PDS to switch from a primary to secondary DS.

The Central database is used to persist and propagate resources on-demand to other DS instances. A Resource table (s) can be created that stores the following information:

| Name | Type |
| --- | --- |
| id (unique, key) | 64 chars? |
| versioned | long |
| RDP | (? Darren) This is just a single jar with a descriptor file, or descriptor values should be added to this table. |

Stored procedures can be created to store a resource, to retrieve a resource and to retrieve a list of all resources.

Each resource consumer, such as the proxies, has the following responsibilities.
(1) Synchronize resources at startup.
(2) Maintain a registry of deployed resources.
(3) Listen for resource notifications.
(4) Retrieve resources and deploy.

Updated resources should only be deployed at scheduled maintenance periods where resource consumers will be stopped and started. If an updated component is introduced otherwise, it may cause different versions of the same resource to be in-use at the same time. The following steps should be taken to update resources.
(1) Stop the service
(2) if using rcopy solution then goto step 6
(3) Start PDS
(4) Send via WebDAV updated RDPs
(5) Goto 8
(6) Rcopy RDPs to Primary DS directory
(7) Start PDS
(8) Restart components, which will now synchronize content.

During synchronization at startup, fail to start if cannot find synchronize. Separate servlet within Soap servlet. Enumerate negs and pos.

An example of a handheld mobile wireless communications device 1000 that may be used is further described in the example below with reference to FIG. 15. The device 1000 illustratively includes a housing 1200, a keypad 1400 and an output device 1600. The output device shown is a display 1600, which is preferably a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400 by the user.

The housing 1200 may be elongated vertically, or may take on other sizes and shapes (including clamshell housing structures). The keypad may include a mode selection key, or other hardware or software for switching between text entry and telephony entry.

Figure 15:
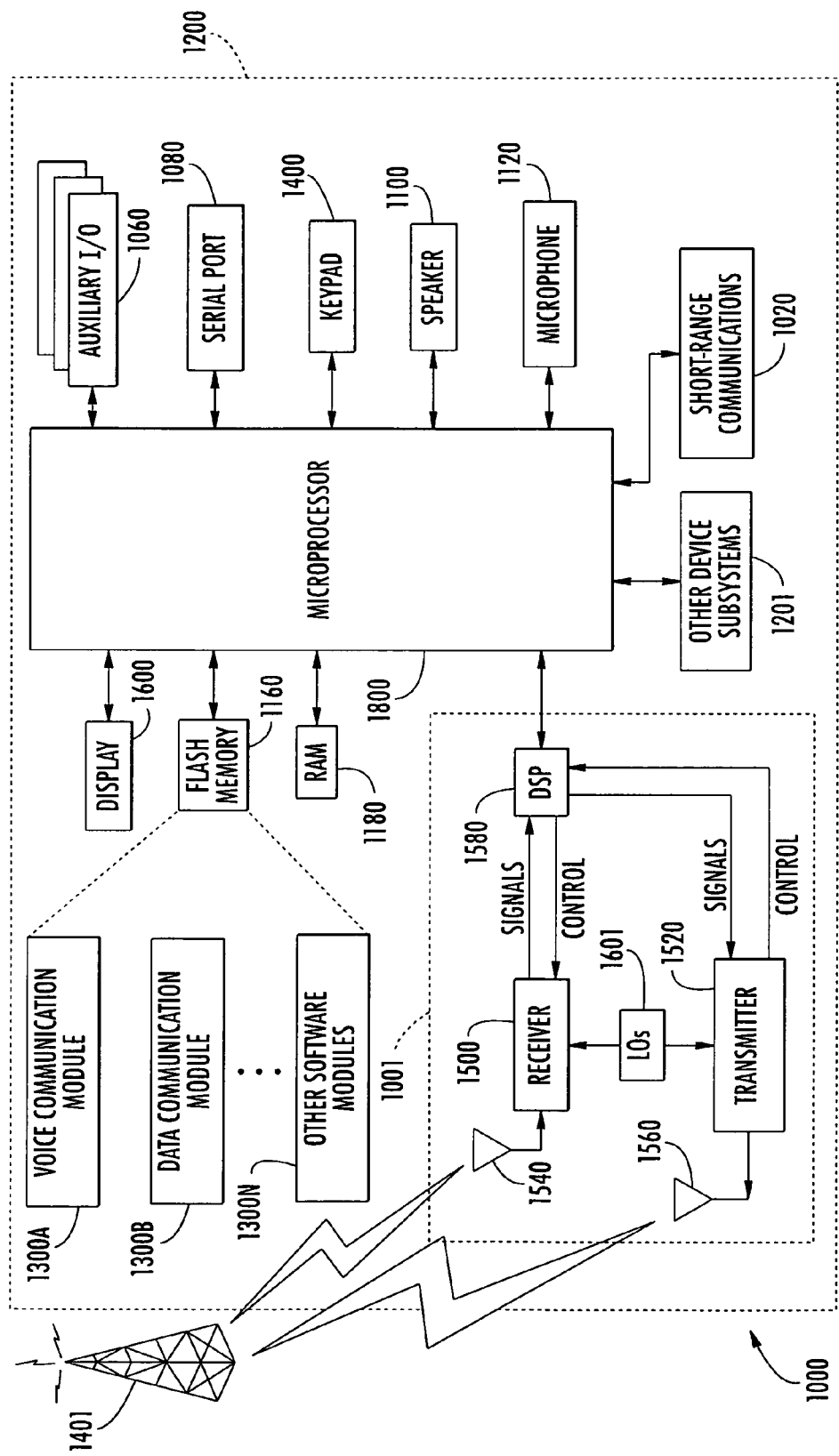
FIG. 15 is a schematic block diagram illustrating an exemplary mobile wireless communications device that can be used with the Direct Access system shown in FIG. 1.

In addition to the processing device 1800, other parts of the mobile device 1000 are shown schematically in FIG. 15. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 is preferably a two-way RF communications device having voice and data communications capabilities. In addition, the mobile device 1000 preferably has the capability to communicate with other computer systems via the Internet.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 1000.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to provide for communication with similarly-enabled systems and devices.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for rendering presentation pages, comprising:
a main server containing at least one resource including at least one of images and text;
calling an XSL extension for one of at least images and text using an extensible stylesheet transformation (XSLT) module of the main server; and
rendering the one of at least images and text into a presentation page based on a language requirement at a foreign locale, at least one proxy server configured to support localization of a display of a mobile device,
the proxy server further comprising a deployment service deploying services from the main server to the proxy server and a cache that caches at least one resource and
the deployment service configured to save the at least one resource to the main server and notify the at least one proxy server of at least one new resource for retrieval from the main server, and check the cache of the proxy server for the at least one new resource before retrieving the at least one new resource from the main server and render through the proxy and the XSLT module at least one resource for repeated use.

2. A method according to claim 1, which further comprises calling a JAVA extension.

3. A method according to claim 1, which further comprises storing a plurality of resource deployment packages (RDPs), each RDP comprising deployment content that can be deployed based on locale.

4. A method according to claim 1, which further comprises communicating with a mobile wireless communications device on which the at least one of images and text are presented.

5. A system for rendering presentation pages, comprising:
a main server containing at least one resource including at least one of images and text, the main server comprising an extensible stylesheet transformation (XSLT) module operative for calling an XSL extension and rendering the at least one resource into a presentation page, based on a language requirement at a foreign locale;
at least one proxy server configured to support localization of a display of a mobile device, the proxy server comprising a cache that caches at least one resource; and
a deployment service deploying services from the main server to the proxy server configured to:
save the at least one resource to the main server,
notify the at least one proxy server of at least one new resource for retrieval from the main server,
check the cache of the proxy server for the at least one new resource before retrieving the at least one new resource from the main server, and render through the proxy and the XSLT module at least one resource for repeated use.

6. A system according to claim 5, wherein a presentation page is rendered into localized content based on locale.

7. A system according to claim 6, and further comprising resource bundles that contain at least one of localized images and text that are rendered into an XML document to be processed by the XSLT module to generate localized content.

8. A system according to claim 6, wherein the localized content comprises content in a foreign language used at the locale.

9. A system according to claim 5, wherein the XSL extension comprises a JAVA extension.

10. A system according to claim 5, wherein the XSLT module is operative for rendering HTMP or WAP output.

11. A system according to claim 5, wherein the main server comprises a web server.

12. A system according to claim 5, wherein the main server comprises an electronic mail (email) server.

13. A system according to claim 5, wherein the main server is operative for storing a plurality of resource deployment packages (RDPs), each RDP comprising deployment content that can be deployed based on locale.

14. A system for rendering presentation pages in a wireless communications system, comprising:
- a mobile wireless communications device;
- a wireless communications network;
- a main server containing at least one resource including at least one of images and text and including;
- a mobile office platform operable for communicating with said mobile wireless communications device over said wireless communications network;
- the main server comprising an extensible stylesheet transformation (XSLT) module operative for calling an XSL extension and rendering the at least one resource into a presentation page on said mobile wireless communications device, based on a language requirement at a foreign locale;
- at least one proxy server configured to support localization of a display of a mobile device, the proxy server comprising
- a cache that caches at least one resource; and
- a deployment service deploying services from the main server to the proxy server configured to:
- save the at least one resource to the main server;
- notify the at least one proxy server of at least one new resource for retrieval from the main server,
- check the cache of the proxy server for the at least one new resource before retrieving the at least one new resource from the main server, and render through the proxy and the XSLT module at least one resource for repeated use.

15. A system according to claim 14, wherein a presentation page is rendered into a localized content based on locale.

16. A system according to claim 15, and further comprising resource bundles that contain one of at least localized images and text that are rendered into an XML document to be processed by the XSLT module to generate localized content.

17. A system according to claim 15, wherein the localized content comprises content in a foreign language used at the locale.

18. A system according to claim 14, wherein the extension comprises a JAVA extension.

19. A system according to claim 14, wherein the XSLT module is operative for rendering HTMP or WAP output.

20. A system according to claim 14, and further comprising a web server operable with the mobile office platform.

21. A system according to claim 14, wherein the mobile office platform is operative for storing a plurality of resource deployment packages (RDPs), each RDP comprising deployment content that can be deployed based on locale.

* * * * *